US011870171B2

(12) United States Patent
Guo et al.

(10) Patent No.: US 11,870,171 B2
(45) Date of Patent: Jan. 9, 2024

(54) HIGH-DENSITY EDGE CONNECTOR

(71) Applicant: Amphenol Commercial Products (Chengdu) Co., Ltd., Chengdu (CN)

(72) Inventors: Rongzhe Guo, Chengdu (CN); Tao Zeng, Chengdu (CN); Qian Feng, Chengdu (CN)

(73) Assignee: Amphenol Commercial Products (Chengdu) Co., Ltd., Chengdu (CN)

( * ) Notice: Subject to any disclaimer, the term of this patent is extended or adjusted under 35 U.S.C. 154(b) by 323 days.

(21) Appl. No.: 17/283,511

(22) PCT Filed: Dec. 1, 2018

(86) PCT No.: PCT/CN2018/118798
§ 371 (c)(1),
(2) Date: Apr. 7, 2021

(87) PCT Pub. No.: WO2020/073460
PCT Pub. Date: Apr. 16, 2020

(65) Prior Publication Data

US 2021/0399449 A1 Dec. 23, 2021

(30) Foreign Application Priority Data

Oct. 9, 2018 (CN) ......................... 201821637282.6
Oct. 9, 2018 (CN) ......................... 201821637283.0
Oct. 9, 2018 (CN) ......................... 201821637284.5

(51) Int. Cl.
*H01R 13/648* (2006.01)
*H01R 12/73* (2011.01)
(Continued)

(52) U.S. Cl.
CPC ....... *H01R 12/737* (2013.01); *H01R 13/6471* (2013.01); *H01R 13/6581* (2013.01); *H01R 13/6591* (2013.01); *H01R 24/58* (2013.01)

(58) Field of Classification Search
CPC ......................... H01R 12/72; H01R 12/73735; H01R 12/737; H01R 13/6471; H01R 13/6581; H01R 13/6591; H01R 24/58
(Continued)

(56) References Cited

U.S. PATENT DOCUMENTS 2,996,710 A 8/1961 Pratt
3,002,162 A 9/1961 Garstang
(Continued)

FOREIGN PATENT DOCUMENTS

CN 1192068 A 9/1998
CN 1175101 A 3/1999
(Continued)

OTHER PUBLICATIONS

U.S. Appl. No. 16/721,594, filed Dec. 19, 2019, Lu.
(Continued)

*Primary Examiner* — Khiem M Nguyen
(74) *Attorney, Agent, or Firm* — Wolf, Greenfield & Sacks, P.C.

(57) ABSTRACT

A high density edge connector that provides robust operation and good signal integrity. The connector is configurable to have sections tailored for high speed signals, which may be differential, or low speed signals. The connector may be assembled from signal terminals and ground terminals, either of which may be mounted within an insulative housing of the connector at any location along a row aligned with a slot of a mating interface. Shield members or lossy members may optionally be included for high speed segments, either or both of which may be electrically coupled to the ground terminals. Insertion and retention force may be limited, despite a dense array of contacts pressing on a card inserted into the connector by shaping the portions of the signal or ground contacts that act as beams generating that
(Continued)

force. Such force may be limited with twists in the beams and/or splitting the beam portions.

27 Claims, 23 Drawing Sheets

(51) Int. Cl.
*H01R 13/6471* (2011.01)
*H01R 13/6581* (2011.01)
*H01R 13/6591* (2011.01)
*H01R 24/58* (2011.01)

(58) Field of Classification Search
USPC .......................... 439/59–62, 607.31, 607.32
See application file for complete search history.

(56) References Cited

U.S. PATENT DOCUMENTS 3,134,950 A 5/1964 Cook
3,322,885 A 5/1967 May et al.
3,530,422 A 9/1970 Goodman
3,631,381 A 12/1971 Pittman
3,786,372 A 1/1974 Epis et al.
3,825,874 A 7/1974 Peverill
3,863,181 A 1/1975 Glance et al.
3,977,757 A 8/1976 Yurtin
4,155,613 A 5/1979 Brandeau
4,195,272 A 3/1980 Boutros
4,276,523 A 6/1981 Boutros et al.
4,286,837 A 9/1981 Yasutake et al.
4,371,742 A 2/1983 Manly
4,408,255 A 10/1983 Adkins
4,447,105 A 5/1984 Ruehl
4,471,015 A 9/1984 Ebneth et al.
4,484,159 A 11/1984 Whitley
4,490,283 A 12/1984 Kleiner
4,518,651 A 5/1985 Wolfe, Jr.
4,519,664 A 5/1985 Tillotson
4,519,665 A 5/1985 Althouse et al.
4,632,476 A 12/1986 Schell
4,636,752 A 1/1987 Saito
4,682,129 A 7/1987 Bakermans et al.
4,687,267 A 8/1987 Header et al.
4,728,762 A 3/1988 Roth et al.
4,751,479 A 6/1988 Parr
4,761,147 A 8/1988 Gauthier
4,787,548 A 11/1988 Abbagnaro et al.
4,806,107 A 2/1989 Arnold et al.
4,846,724 A 7/1989 Sasaki et al.
4,846,727 A 7/1989 Glover et al.
4,871,316 A 10/1989 Herrell et al.
4,878,155 A 10/1989 Conley
4,948,922 A 8/1990 Varadan et al.
4,970,354 A 11/1990 Iwasa et al.
4,975,084 A 12/1990 Fedder et al.
4,992,060 A 2/1991 Meyer
5,000,700 A 3/1991 Masubuchi et al.
5,024,609 A 6/1991 Piorunnek
5,041,023 A 8/1991 Lytle
5,066,236 A 11/1991 Broeksteeg
5,141,454 A 8/1992 Garrett et al.
5,150,086 A 9/1992 Ito
5,166,527 A 11/1992 Solymar
5,168,252 A 12/1992 Naito
5,168,432 A 12/1992 Murphy et al.
5,171,161 A 12/1992 Kachlic
5,176,538 A 1/1993 Hansell, III et al.
5,266,055 A 11/1993 Naito et al.
5,280,257 A 1/1994 Cravens et al.
5,287,076 A 2/1994 Johnescu et al.
5,334,050 A 8/1994 Andrews
5,340,334 A 8/1994 Nguyen
5,346,410 A 9/1994 Moore, Jr.
5,429,520 A 7/1995 Morlion et al.
5,429,521 A 7/1995 Morlion et al.
5,433,617 A 7/1995 Morlion et al.
5,433,618 A 7/1995 Morlion et al.
5,456,619 A 10/1995 Belopolsky et al.
5,461,392 A 10/1995 Mott et al.
5,474,472 A 12/1995 Niwa et al.
5,484,310 A 1/1996 McNamara et al.
5,496,183 A 3/1996 Soes et al.
5,499,935 A 3/1996 Powell
5,551,893 A 9/1996 Johnson
5,562,497 A 10/1996 Yagi et al.
5,597,328 A 1/1997 Mouissie
5,651,702 A 7/1997 Hanning et al.
5,669,789 A 9/1997 Law
5,796,323 A 8/1998 Uchikoba et al.
5,810,623 A 9/1998 Regnier et al.
5,831,491 A 11/1998 Buer et al.
5,885,088 A 3/1999 Brennan et al.
5,924,899 A 7/1999 Paagman
5,981,869 A 11/1999 Kroger
5,982,253 A 11/1999 Perrin et al.
5,993,259 A 11/1999 Stokoe et al.
6,019,616 A 2/2000 Yagi et al.
6,152,747 A 11/2000 McNamara
6,168,469 B1 1/2001 Lu
6,174,202 B1 1/2001 Mitra
6,174,203 B1 1/2001 Asao
6,174,944 B1 1/2001 Chiba et al.
6,217,372 B1 4/2001 Reed
6,293,827 B1 9/2001 Stokoe
6,296,491 B1 10/2001 Pickles
6,296,496 B1 10/2001 Trammel
6,299,438 B1 10/2001 Sahagian et al.
6,299,483 B1 10/2001 Cohen et al.
6,315,615 B1 11/2001 Raistrick
6,322,395 B1 11/2001 Nishio et al.
6,328,601 B1 12/2001 Yip et al.
6,347,962 B1 2/2002 Kline
6,350,134 B1 2/2002 Fogg et al.
6,361,363 B1 3/2002 Hwang
6,364,711 B1 4/2002 Berg et al.
6,375,510 B2 4/2002 Asao
6,379,188 B1 4/2002 Cohen et al.
6,394,842 B1 5/2002 Sakurai et al.
6,398,588 B1 6/2002 Bickford
6,409,543 B1 6/2002 Astbury, Jr. et al.
6,447,170 B1 9/2002 Takahashi et al.
6,482,017 B1 11/2002 Van Doorn
6,503,103 B1 1/2003 Cohen et al.
6,506,076 B2 1/2003 Cohen et al.
6,517,360 B1 2/2003 Cohen
6,530,790 B1 3/2003 McNamara et al.
6,537,087 B2 3/2003 McNamara et al.
6,540,559 B1 4/2003 Kemmick et al.
6,551,140 B2 4/2003 Billman et al.
6,554,647 B1 4/2003 Cohen et al.
6,565,387 B2 5/2003 Cohen
6,565,390 B2 5/2003 Wu
6,579,116 B2 6/2003 Brennan et al.
6,582,244 B2 6/2003 Fogg et al.
6,592,381 B2 7/2003 Cohen et al.
6,595,801 B1 7/2003 Leonard et al.
6,595,802 B1 7/2003 Watanabe et al.
6,602,095 B2 8/2003 Astbury, Jr. et al.
6,607,402 B2 8/2003 Cohen et al.
6,609,922 B2 8/2003 Torii
6,616,864 B1 9/2003 Jiang et al.
6,652,318 B1 11/2003 Winings et al.
6,652,319 B1 11/2003 Billman
6,655,966 B2 12/2003 Rothermel et al.
6,709,294 B1 3/2004 Cohen et al.
6,713,672 B1 3/2004 Stickney
6,726,492 B1 4/2004 Yu
6,743,057 B2 6/2004 Davis et al.
6,749,463 B1 6/2004 Fan
6,776,659 B1 8/2004 Stokoe et al.
6,786,771 B2 9/2004 Gailus
6,808,420 B2 10/2004 Whiteman, Jr. et al.
6,814,619 B1 11/2004 Stokoe et al.

(56) References Cited

U.S. PATENT DOCUMENTS 6,830,489 B2 12/2004 Aoyama
6,872,085 B1 3/2005 Cohen et al.
6,875,031 B1 4/2005 Korsunsky et al.
6,932,649 B1 8/2005 Rothermel et al.
6,979,202 B2 12/2005 Benham et al.
6,979,226 B2 12/2005 Otsu et al.
6,986,681 B2 1/2006 Tsai
7,008,267 B2 3/2006 Fan
7,044,794 B2 5/2006 Consoli et al.
7,057,570 B2 6/2006 Irion, II et al.
7,074,086 B2 7/2006 Cohen et al.
7,086,872 B2 8/2006 Myer et al.
7,094,102 B2 8/2006 Cohen et al.
7,104,842 B1 9/2006 Huang et al.
7,108,556 B2 9/2006 Cohen et al.
7,156,672 B2 1/2007 Fromm et al.
7,163,421 B1 1/2007 Cohen et al.
7,232,344 B1 6/2007 Gillespie et al.
7,285,018 B2 10/2007 Kenny et al.
7,316,585 B2 1/2008 Smith et al.
7,318,740 B1 1/2008 Henry et al.
7,320,614 B2 1/2008 Toda et al.
7,322,845 B2 1/2008 Regnier et al.
7,331,822 B2 2/2008 Chen
7,335,063 B2 2/2008 Cohen et al.
7,364,464 B2 4/2008 Iino et al.
7,371,117 B2 5/2008 Gailus
7,407,413 B2 8/2008 Minich
7,467,977 B1 12/2008 Yi et al.
7,473,124 B1 1/2009 Briant et al.
7,494,383 B2 2/2009 Cohen et al.
7,540,781 B2 6/2009 Kenny et al.
7,581,990 B2 9/2009 Kirk et al.
7,588,464 B2 9/2009 Kim
7,604,502 B2 10/2009 Pan
7,645,165 B2 1/2010 Wu et al.
7,690,946 B2 4/2010 Knaub et al.
7,699,644 B2 4/2010 Szczesny et al.
7,722,401 B2 5/2010 Kirk et al.
7,727,027 B2 6/2010 Chiang et al.
7,727,028 B1 6/2010 Zhang et al.
7,731,537 B2 6/2010 Amleshi et al.
7,731,541 B1 6/2010 Lee et al.
7,753,731 B2 7/2010 Cohen et al.
7,771,233 B2 8/2010 Gailus
7,789,676 B2 9/2010 Morgan et al.
7,794,240 B2 9/2010 Cohen et al.
7,794,278 B2 9/2010 Cohen et al.
7,806,729 B2 10/2010 Nguyen et al.
7,824,192 B2 11/2010 Lin et al.
7,871,296 B2 1/2011 Fowler et al.
7,874,873 B2 1/2011 Do et al.
7,883,369 B1 2/2011 Sun et al.
7,887,371 B2 2/2011 Kenny et al.
7,887,379 B2 2/2011 Kirk
7,906,730 B2 3/2011 Atkinson et al.
7,914,304 B2 3/2011 Cartier et al.
7,946,889 B2 5/2011 Mizumura
7,985,097 B2 7/2011 Gulla
7,993,147 B2 8/2011 Cole et al.
8,018,733 B2 9/2011 Jia
8,083,553 B2 12/2011 Manter et al.
8,123,544 B2 2/2012 Kobayashi
8,142,207 B1 3/2012 Ljubijankic et al.
8,182,289 B2 5/2012 Stokoe et al.
8,215,968 B2 7/2012 Cartier et al.
8,216,001 B2 7/2012 Kirk
8,262,411 B2 9/2012 Kondo
8,272,877 B2 9/2012 Stokoe et al.
8,337,247 B2 12/2012 Zhu
8,348,701 B1 1/2013 Lan et al.
8,371,875 B2 2/2013 Gailus
8,382,524 B2 2/2013 Khilchenko et al.
8,440,637 B2 5/2013 Elmen
8,480,432 B2 7/2013 Wu
8,506,319 B2 8/2013 Ritter et al.
8,506,331 B2 8/2013 Wu
8,545,253 B2 10/2013 Amidon et al.
8,550,861 B2 10/2013 Cohen et al.
8,597,051 B2 12/2013 Yang et al.
8,657,627 B2 2/2014 McNamara et al.
8,715,003 B2 5/2014 Buck et al.
8,715,005 B2 5/2014 Pan
8,740,637 B2 6/2014 Wang et al.
8,764,492 B2 7/2014 Chiang
8,771,016 B2 7/2014 Atkinson et al.
8,864,506 B2 10/2014 Little
8,864,521 B2 10/2014 Atkinson et al.
8,905,777 B2 12/2014 Zhu et al.
8,926,377 B2 1/2015 Kirk et al.
8,944,831 B2 2/2015 Stoner et al.
8,968,034 B2 3/2015 Hsu
8,998,642 B2 4/2015 Manter et al.
9,004,942 B2 4/2015 Paniauqa
9,011,177 B2 4/2015 Lloyd et al.
9,022,806 B2 5/2015 Cartier, Jr. et al.
9,028,281 B2 5/2015 Kirk et al.
9,065,230 B2 6/2015 Milbrand, Jr.
9,124,009 B2 9/2015 Atkinson et al.
9,166,317 B2 10/2015 Briant et al.
9,219,335 B2 12/2015 Atkinson et al.
9,225,085 B2 12/2015 Cartier, Jr. et al.
9,246,253 B1 1/2016 Defibaugh et al.
9,257,778 B2 2/2016 Buck et al.
9,257,794 B2 2/2016 Wanha et al.
9,263,835 B2 2/2016 Guo
9,281,590 B1 3/2016 Liu et al.
9,287,668 B2 3/2016 Chen et al.
9,300,074 B2 3/2016 Gailus
9,337,585 B1 5/2016 Yang
9,350,095 B2 5/2016 Arichika et al.
9,431,734 B2 8/2016 Guo et al.
9,450,344 B2 9/2016 Cartier, Jr. et al.
9,484,674 B2 11/2016 Cartier, Jr. et al.
9,509,101 B2 11/2016 Cartier, Jr. et al.
9,520,686 B2 12/2016 Hu et al.
9,520,689 B2 12/2016 Cartier, Jr. et al.
9,531,130 B1 12/2016 Phillips et al.
9,537,250 B2 1/2017 Kao et al.
9,640,915 B2 5/2017 Phillips
9,692,183 B2 6/2017 Phillips
9,742,132 B1 8/2017 Hsueh
9,831,605 B2 11/2017 Buck et al.
9,843,135 B2 12/2017 Guetig et al.
9,887,485 B2 2/2018 Lambie et al.
9,935,385 B2 4/2018 Phillips et al.
9,972,945 B1 5/2018 Huang et al.
9,997,853 B2 6/2018 Little et al.
9,997,871 B2 6/2018 Zhong
10,050,369 B1 8/2018 Yang
10,122,129 B2 11/2018 Milbrand, Jr. et al.
10,135,197 B2 11/2018 Little et al.
10,211,577 B2 2/2019 Milbrand, Jr. et al.
10,243,304 B2 3/2019 Kirk et al.
10,270,191 B1 4/2019 Li et al.
10,276,995 B2 4/2019 Little
10,283,910 B1 5/2019 Chen et al.
10,320,102 B2 6/2019 Phillips et al.
10,320,125 B2 6/2019 Ju et al.
10,348,040 B2 7/2019 Cartier, Jr. et al.
10,381,767 B1 8/2019 Milbrand, Jr. et al.
10,431,936 B2 10/2019 Horning et al.
10,439,311 B2 10/2019 Phillips et al.
10,511,128 B2 12/2019 Kirk et al.
10,541,482 B2 1/2020 Sasame et al.
10,573,987 B2 2/2020 Osaki et al.
10,601,181 B2 3/2020 Lu et al.
10,680,387 B2 6/2020 Cheng et al.
10,714,875 B2 7/2020 Wan et al.
10,741,944 B2 8/2020 Long
10,777,921 B2 9/2020 Lu et al.
10,797,446 B2 10/2020 Liu et al.
10,826,214 B2 11/2020 Phillips et al.
10,833,437 B2 11/2020 Huang et al.

(56) References Cited

U.S. PATENT DOCUMENTS 10,840,622 B2 11/2020 Sasame et al.
10,855,020 B1 12/2020 Phillips et al.
10,950,961 B2 3/2021 Lai et al.
10,965,064 B2 3/2021 Hsu et al.
11,146,025 B2 10/2021 Lu et al.
11,189,971 B2 11/2021 Lu
11,264,755 B2 3/2022 Te
11,381,015 B2 7/2022 Lu
11,444,397 B2 9/2022 Sasame et al.
11,588,277 B2 2/2023 Jiang
11,621,525 B2 * 4/2023 Lin .................... H01R 13/502 439/83
2001/0012730 A1 8/2001 Ramey et al.
2001/0042632 A1 11/2001 Manov et al.
2001/0046810 A1 11/2001 Cohen et al.
2002/0042223 A1 4/2002 Belopolsky et al.
2002/0061671 A1 5/2002 Torii
2002/0089464 A1 7/2002 Joshi
2002/0098738 A1 7/2002 Astbury et al.
2002/0111068 A1 8/2002 Cohen et al.
2002/0111069 A1 8/2002 Astbury et al.
2002/0123266 A1 9/2002 Ramey et al.
2002/0132518 A1 9/2002 Kobayashi
2002/0146926 A1 10/2002 Fogg et al.
2003/0119360 A1 6/2003 Jiang et al.
2003/0220018 A1 11/2003 Winings et al.
2004/0005815 A1 1/2004 Mizumura et al.
2004/0020674 A1 2/2004 McFadden et al.
2004/0058572 A1 3/2004 Fromm et al.
2004/0115968 A1 6/2004 Cohen
2004/0121652 A1 6/2004 Gailus
2004/0171305 A1 9/2004 McGowan et al.
2004/0196112 A1 10/2004 Welbon et al.
2004/0235352 A1 11/2004 Takemasa
2004/0259419 A1 12/2004 Payne et al.
2005/0042928 A1 2/2005 Yi et al.
2005/0048818 A1 3/2005 Pan
2005/0048838 A1 3/2005 Korsunsky et al.
2005/0048842 A1 3/2005 Benham et al.
2005/0070160 A1 3/2005 Cohen et al.
2005/0133245 A1 6/2005 Katsuyama et al.
2005/0176835 A1 8/2005 Kobayashi et al.
2005/0233610 A1 10/2005 Tutt et al.
2005/0283974 A1 12/2005 Richard et al.
2005/0287869 A1 12/2005 Kenny et al.
2006/0019525 A1 1/2006 Lloyd et al.
2006/0068640 A1 3/2006 Gailus
2006/0166560 A1 7/2006 Shuey et al.
2006/0255876 A1 11/2006 Kushta et al.
2006/0276082 A1 12/2006 Hung et al.
2006/0292932 A1 12/2006 Benham et al.
2007/0004282 A1 1/2007 Cohen et al.
2007/0004828 A1 1/2007 Khabbaz
2007/0021000 A1 1/2007 Laurx
2007/0021001 A1 1/2007 Laurx et al.
2007/0021002 A1 1/2007 Laurx et al.
2007/0021003 A1 1/2007 Laurx et al.
2007/0021004 A1 1/2007 Laurx et al.
2007/0037419 A1 2/2007 Sparrowhawk
2007/0042639 A1 2/2007 Manter et al.
2007/0054554 A1 3/2007 Do et al.
2007/0059961 A1 3/2007 Cartier et al.
2007/0155241 A1 7/2007 Lappohn
2007/0173118 A1 7/2007 Chen
2007/0197063 A1 8/2007 Ngo et al.
2007/0218765 A1 9/2007 Cohen et al.
2007/0243764 A1 10/2007 Liu et al.
2007/0293084 A1 12/2007 Ngo
2008/0020640 A1 1/2008 Zhang et al.
2008/0194146 A1 8/2008 Gailus
2008/0246555 A1 10/2008 Kirk et al.
2008/0248658 A1 10/2008 Cohen et al.
2008/0248659 A1 10/2008 Cohen et al.
2008/0248660 A1 10/2008 Kirk et al.
2009/0011641 A1 1/2009 Cohen et al.
2009/0011645 A1 1/2009 Laurx et al.
2009/0035955 A1 2/2009 McNamara
2009/0061661 A1 3/2009 Shuey et al.
2009/0117386 A1 5/2009 Vacanti et al.
2009/0203259 A1 8/2009 Nguyen et al.
2009/0239395 A1 9/2009 Cohen et al.
2009/0258516 A1 10/2009 Hiew et al.
2009/0291593 A1 11/2009 Atkinson et al.
2009/0305530 A1 12/2009 Ito et al.
2009/0305533 A1 12/2009 Feldman et al.
2009/0305553 A1 12/2009 Thomas et al.
2010/0048058 A1 2/2010 Morgan et al.
2010/0068934 A1 3/2010 Li et al.
2010/0075538 A1 3/2010 Ohshida
2010/0081302 A1 4/2010 Atkinson et al.
2010/0112846 A1 5/2010 Kotaka
2010/0124851 A1 5/2010 Xiong et al.
2010/0144167 A1 6/2010 Fedder et al.
2010/0203772 A1 8/2010 Mao et al.
2010/0291806 A1 11/2010 Minich et al.
2010/0294530 A1 11/2010 Atkinson et al.
2011/0003509 A1 1/2011 Gailus
2011/0067237 A1 3/2011 Cohen et al.
2011/0104948 A1 5/2011 Girard, Jr. et al.
2011/0130038 A1 6/2011 Cohen et al.
2011/0136388 A1 6/2011 Fu et al.
2011/0143605 A1 6/2011 Pepe
2011/0212649 A1 9/2011 Stokoe et al.
2011/0212650 A1 9/2011 Amleshi et al.
2011/0230095 A1 9/2011 Atkinson et al.
2011/0230096 A1 9/2011 Atkinson et al.
2011/0256739 A1 10/2011 Toshiyuki et al.
2011/0287663 A1 11/2011 Gailus et al.
2012/0094536 A1 4/2012 Khilchenko et al.
2012/0156929 A1 6/2012 Manter et al.
2012/0184145 A1 7/2012 Zeng
2012/0184154 A1 7/2012 Frank et al.
2012/0202363 A1 8/2012 McNamara et al.
2012/0202386 A1 8/2012 McNamara et al.
2012/0202387 A1 8/2012 McNamara
2012/0214344 A1 8/2012 Cohen et al.
2013/0012038 A1 1/2013 Kirk et al.
2013/0017733 A1 1/2013 Kirk et al.
2013/0065454 A1 3/2013 Milbrand Jr.
2013/0078870 A1 3/2013 Milbrand, Jr.
2013/0078871 A1 3/2013 Milbrand, Jr.
2013/0090001 A1 4/2013 Kagotani
2013/0109232 A1 5/2013 Paniaqua
2013/0143442 A1 6/2013 Cohen et al.
2013/0196553 A1 8/2013 Gailus
2013/0217263 A1 8/2013 Pan
2013/0225006 A1 8/2013 Khilchenko et al.
2013/0237100 A1 9/2013 Affeltranger
2013/0316590 A1 11/2013 Hon
2014/0004724 A1 1/2014 Cartier, Jr. et al.
2014/0004726 A1 1/2014 Cartier, Jr. et al.
2014/0004746 A1 1/2014 Cartier, Jr. et al.
2014/0024263 A1 1/2014 Dong et al.
2014/0057498 A1 2/2014 Cohen
2014/0113487 A1 4/2014 Chen et al.
2014/0273557 A1 9/2014 Cartier, Jr. et al.
2014/0273627 A1 9/2014 Cartier, Jr. et al.
2014/0370729 A1 12/2014 Wang
2014/0377992 A1 12/2014 Chang et al.
2015/0056856 A1 2/2015 Atkinson et al.
2015/0072546 A1 3/2015 Li
2015/0099408 A1 4/2015 Myer et al.
2015/0111401 A1 4/2015 Guo
2015/0111427 A1 4/2015 Foxconn
2015/0126068 A1 5/2015 Fang
2015/0140866 A1 5/2015 Tsai et al.
2015/0214673 A1 7/2015 Gao et al.
2015/0236451 A1 8/2015 Cartier, Jr. et al.
2015/0236452 A1 8/2015 Cartier, Jr. et al.
2015/0255904 A1 9/2015 Ito
2015/0255926 A1 9/2015 Paniagua
2015/0340798 A1 11/2015 Kao et al.
2016/0118736 A1 4/2016 Hoyack et al.
2016/0149343 A1 5/2016 Atkinson et al.

(56) References Cited

U.S. PATENT DOCUMENTS

| | | | |
|---|---|---|---|
| 2016/0268744 | A1 | 9/2016 | Little et al. |
| 2017/0077654 | A1 | 3/2017 | Yao et al. |
| 2017/0302031 | A1 | 10/2017 | Cheng et al. |
| 2017/0352970 | A1 | 12/2017 | Liang et al. |
| 2018/0062323 | A1 | 3/2018 | Kirk et al. |
| 2018/0076555 | A1 | 3/2018 | Scholeno et al. |
| 2018/0145438 | A1 | 5/2018 | Cohen |
| 2018/0198220 | A1 | 7/2018 | Sasame et al. |
| 2018/0205177 | A1 | 7/2018 | Zhou et al. |
| 2018/0212376 | A1 | 7/2018 | Wang et al. |
| 2018/0212385 | A1 | 7/2018 | Little |
| 2018/0219331 | A1 | 8/2018 | Cartier, Jr. et al. |
| 2018/0241156 | A1 | 8/2018 | Huang et al. |
| 2018/0269607 | A1 | 9/2018 | Wu et al. |
| 2018/0331444 | A1 | 11/2018 | Ono |
| 2019/0006778 | A1 | 1/2019 | Fan et al. |
| 2019/0044284 | A1 | 2/2019 | Dunham |
| 2019/0052019 | A1 | 2/2019 | Huang et al. |
| 2019/0067854 | A1 | 2/2019 | Ju et al. |
| 2019/0165518 | A1 | 5/2019 | Hsu et al. |
| 2019/0173209 | A1 | 6/2019 | Lu et al. |
| 2019/0173232 | A1 | 6/2019 | Lu et al. |
| 2019/0214755 | A1 | 7/2019 | Manickam |
| 2019/0334292 | A1 | 10/2019 | Cartier, Jr. et al. |
| 2020/0021052 | A1 | 1/2020 | Milbrand, Jr. et al. |
| 2020/0076131 | A1 | 3/2020 | Hu et al. |
| 2020/0076135 | A1 | 3/2020 | Tang et al. |
| 2020/0153134 | A1 | 5/2020 | Sasame et al. |
| 2020/0161811 | A1 | 5/2020 | Lu |
| 2020/0203865 | A1 | 6/2020 | Wu et al. |
| 2020/0203867 | A1 | 6/2020 | Lu |
| 2020/0203886 | A1 | 6/2020 | Wu et al. |
| 2020/0235529 | A1 | 7/2020 | Kirk et al. |
| 2020/0259294 | A1 | 8/2020 | Lu |
| 2020/0266584 | A1 | 8/2020 | Lu |
| 2020/0328541 | A1 | 10/2020 | Lai et al. |
| 2020/0335914 | A1 | 10/2020 | Hsu et al. |
| 2020/0358226 | A1 | 11/2020 | Lu et al. |
| 2020/0395698 | A1 | 12/2020 | Hou et al. |
| 2020/0403350 | A1 | 12/2020 | Hsu |
| 2021/0036452 | A1 | 2/2021 | Phillips et al. |
| 2021/0050683 | A1 | 2/2021 | Sasame et al. |
| 2021/0135389 | A1 | 5/2021 | Jiang |
| 2021/0135403 | A1 | 5/2021 | Yang et al. |
| 2021/0135404 | A1 | 5/2021 | Jiang |
| 2021/0203104 | A1 | 7/2021 | Chen |
| 2021/0218195 | A1 | 7/2021 | Hsu et al. |
| 2021/0313726 | A1 | 10/2021 | Huang et al. |
| 2021/0351529 | A1 | 11/2021 | Yang et al. |
| 2021/0399449 | A1* | 12/2021 | Guo .................. H01R 13/6591 |
| 2022/0059954 | A1 | 2/2022 | Yue |
| 2022/0069496 | A1 | 3/2022 | Yi et al. |
| 2022/0077632 | A1 | 3/2022 | Chen et al. |
| 2022/0336980 | A1 | 10/2022 | Lu |
| 2022/0360016 | A1 | 11/2022 | Lu et al. |
| 2023/0013147 | A1 | 1/2023 | Lu |

FOREIGN PATENT DOCUMENTS

| | | | |
|---|---|---|---|
| CN | 1275825 | A | 12/2000 |
| CN | 2519434 | Y | 10/2002 |
| CN | 1179448 | C | 12/2004 |
| CN | 1650479 | A | 8/2005 |
| CN | 1799290 | A | 7/2006 |
| CN | 2896615 | Y | 5/2007 |
| CN | 1996678 | A | 7/2007 |
| CN | 2930006 | Y | 8/2007 |
| CN | 101019277 | A | 8/2007 |
| CN | 101176389 | A | 5/2008 |
| CN | 101208837 | A | 6/2008 |
| CN | 101312275 | A | 11/2008 |
| CN | 201323275 | Y | 10/2009 |
| CN | 101600293 | A | 12/2009 |
| CN | 201374434 | Y | 12/2009 |
| CN | 101752700 | A | 6/2010 |
| CN | 101790818 | A | 7/2010 |
| CN | 101120490 | B | 11/2010 |
| CN | 101926055 | A | 12/2010 |
| CN | 201846527 | U | 5/2011 |
| CN | 102106041 | A | 6/2011 |
| CN | 201868621 | U | 6/2011 |
| CN | 102195173 | A | 9/2011 |
| CN | 102224640 | A | 10/2011 |
| CN | 102232259 | A | 11/2011 |
| CN | 102239605 | A | 11/2011 |
| CN | 102292881 | A | 12/2011 |
| CN | 101600293 | B | 5/2012 |
| CN | 102456990 | A | 5/2012 |
| CN | 102487166 | A | 6/2012 |
| CN | 102593661 | A | 7/2012 |
| CN | 102598430 | A | 7/2012 |
| CN | 202395248 | U | 8/2012 |
| CN | 102694318 | A | 9/2012 |
| CN | 102714363 | A | 10/2012 |
| CN | 102738621 | A | 10/2012 |
| CN | 102859805 | A | 1/2013 |
| CN | 202695788 | U | 1/2013 |
| CN | 202695861 | U | 1/2013 |
| CN | 203445304 | U | 2/2014 |
| CN | 103840285 | A | 6/2014 |
| CN | 203690614 | U | 7/2014 |
| CN | 204030057 | U | 12/2014 |
| CN | 204167554 | U | 2/2015 |
| CN | 104409906 | A | 3/2015 |
| CN | 104577577 | A | 4/2015 |
| CN | 104659573 | A | 5/2015 |
| CN | 204349140 | U | 5/2015 |
| CN | 204577746 | U | 8/2015 |
| CN | 204696287 | U | 10/2015 |
| CN | 105633660 | A | 6/2016 |
| CN | 105703103 | A | 6/2016 |
| CN | 106099546 | A | 11/2016 |
| CN | 107069281 | A | 8/2017 |
| CN | 304240766 | S | 8/2017 |
| CN | 304245430 | S | 8/2017 |
| CN | 206712072 | U | 12/2017 |
| CN | 206712089 | U | 12/2017 |
| CN | 107706632 | A | 2/2018 |
| CN | 207677189 | U | 7/2018 |
| CN | 108604760 | A | 9/2018 |
| CN | 208078300 | U | 11/2018 |
| CN | 208209042 | U | 12/2018 |
| CN | 208797273 | U | 4/2019 |
| CN | 210326355 | U | 4/2020 |
| CN | 112072400 | A | 12/2020 |
| CN | 202412336 | U | 1/2021 |
| CN | 107706675 | B | 4/2021 |
| CN | 212874843 | U | 4/2021 |
| CN | 113517619 | A | 10/2021 |
| DE | 60216728 | T2 | 11/2007 |
| EP | 0 560 551 | A1 | 9/1993 |
| EP | 0 820 124 | A2 | 1/1998 |
| EP | 1 018 784 | A1 | 7/2000 |
| EP | 1 779 472 | A1 | 5/2007 |
| EP | 2 169 770 | A2 | 3/2010 |
| EP | 2 405 537 | A1 | 1/2012 |
| GB | 1049435 | A | 11/1966 |
| GB | 1272347 | A | 4/1972 |
| JP | H3-156761 | A2 | 7/1991 |
| JP | H07-302649 | A | 11/1995 |
| JP | 2001-510627 | A | 7/2001 |
| JP | 2002-151190 | A2 | 5/2002 |
| JP | 2006-344524 | A | 12/2006 |
| JP | 2010-129173 | A | 6/2010 |
| MX | 9907324 | A1 | 8/2000 |
| TW | 200835073 | A | 8/2008 |
| TW | M357771 | U | 5/2009 |
| TW | M474278 | U | 3/2014 |
| TW | M502979 | U | 6/2015 |
| TW | I535129 | B | 5/2016 |
| TW | M534922 | U | 1/2017 |
| TW | I596840 | B | 8/2017 |
| TW | M558481 | U | 4/2018 |
| TW | M558482 | U | 4/2018 |

(56) References Cited

FOREIGN PATENT DOCUMENTS

| | | |
|---|---|---|
| TW | M558483 U | 4/2018 |
| TW | M559006 U | 4/2018 |
| TW | M559007 U | 4/2018 |
| TW | M560138 U | 5/2018 |
| TW | M562507 U | 6/2018 |
| TW | M565894 Y | 8/2018 |
| TW | M565895 Y | 8/2018 |
| TW | M565899 Y | 8/2018 |
| TW | M565900 Y | 8/2018 |
| TW | M565901 Y | 8/2018 |
| TW | M605564 U | 12/2020 |
| TW | M613035 U | 6/2021 |
| WO | WO 88/05218 A1 | 7/1988 |
| WO | WO 98/35409 A1 | 8/1998 |
| WO | WO 2004/059794 A2 | 7/2004 |
| WO | WO 2004/059801 A1 | 7/2004 |
| WO | WO 2006/039277 A1 | 4/2006 |
| WO | WO 2007/005597 A2 | 1/2007 |
| WO | WO 2007/005599 A1 | 1/2007 |
| WO | WO 2008/124052 A2 | 10/2008 |
| WO | WO 2008/124054 A2 | 10/2008 |
| WO | WO 2008/124057 A2 | 10/2008 |
| WO | WO 2008/124101 A2 | 10/2008 |
| WO | WO 2010/030622 A1 | 3/2010 |
| WO | WO 2010/039188 A1 | 4/2010 |
| WO | WO 2011/100740 A2 | 8/2011 |
| WO | WO 2017/007429 A1 | 1/2017 |

OTHER PUBLICATIONS

U.S. Appl. No. 16/760,400, filed Apr. 29, 2020, Hou et al.
U.S. Appl. No. 16/998,845, filed Aug. 20, 2020, Yue.
U.S. Appl. No. 17/085,342, filed Oct. 30, 2020, Sasame et al.
U.S. Appl. No. 17/089,905, filed Nov. 5, 2020, Jiang.
U.S. Appl. No. 17/089,934, filed Nov. 5, 2020, Jiang.
U.S. Appl. No. 17/216,463, filed Mar. 29, 2021, Hsu et al.
U.S. Appl. No. 17/402,255, filed Aug. 13, 2021, Yi et al.
CN 201580014851.4, Jun. 1, 2020, Chinese Communication.
CN 201580014851.4, Sep. 4, 2019, Chinese Office Action.
CN 201680051491.X, Apr. 30, 2019, Chinese Office Action.
CN 201780064531.9, Jan. 2, 2020, Chinese Office Action.
CN 20178009791.9, Dec. 3, 2021, Chinese Office Action.
CN 201780097919.9, Mar. 10, 2021, Chinese Office Action.
CN 202010031395.7, Jan. 18, 2021, Chinese Office Action.
EP 11166820.8, Jan. 24, 2012, Extended European Search Report.
EP 17930428.2, May 19, 2021, Extended European Search Report.
PCT/CN2017/108344, Aug. 1, 2018, International Search Report and Written Opinion.
PCT/CN2017/108344, Mar. 6, 2020, International Preliminary Report on Patentability Chapter II.
PCT/CN2018/118798, Jul. 18, 2019, International Search Report and Written Opinion.
PCT/CN2021/114671, Nov. 29, 2021, International Search Report and Written Opinion.
PCT/SG2016/050317, Jan. 18, 2018, International Preliminary Report on Patentability.
PCT/SG2016/050317, Oct. 18, 2016, International Search Report and Written Opinion.
PCT/US2005/034605, Jan. 26, 2006, International Search Report and Written Opinion.
PCT/US2006/025562, Oct. 31, 2007, International Search Report with Written Opinion.
PCT/US2010/056482, May 24, 2012, International Preliminary Report on Patentability.
PCT/US2010/056482, Mar. 14, 2011, International Search Report and Written Opinion.
PCT/US2011/026139, Sep. 7, 2012, International Preliminary Report on Patentability.
PCT/US2011/026139, Nov. 22, 2011, International Search Report and Written Opinion.
PCT/US2011/034747, Jul. 28, 2011, International Search Report and Written Opinion.
PCT/US2012/023689, Aug. 15, 2013, International Preliminary Report on Patentability.
PCT/US2012/023689, Sep. 12, 2012, International Search Report and Written Opinion.
PCT/US2012/060610, Mar. 29, 2013 International Search Report and Written Opinion.
PCT/US2015/012463, May 13, 2015, International Search Report and Written Opinion.
PCT/US2017/047905, Dec. 4, 2017, International Search Report and Written Opinion.
Chinese communication for Chinese Application No. 201580014851.4, dated Jun. 1, 2020.
Chinese Office Action for Chinese Application No. 201580014851.4 dated Sep. 4, 2019.
Chinese Office Action for Application No. 201680051491.X dated Apr. 30, 2019.
Chinese Office Action for Chinese Application No. 201780064531.9 dated Jan. 2, 2020.
Chinese Office Action for Chinese Application No. 201780097919.9, dated Dec. 3, 2021.
Chinese Office Action for Chinese Application No. 201780097919.9, dated Mar. 10, 2021.
Chinese Office Action dated Jan. 18, 2021 in connection with Chinese Application No. 202010031395.7.
Extended European Search Report for European Application No. EP 11166820.8 dated Jan. 24, 2012.
Extended European Search Report dated May 19, 2021 in connection with European Application No. 17930428.2.
International Preliminary Report on Patentability Chapter II for International Application No. PCT/CN2017/108344 dated Mar. 6, 2020.
International Search Report and Written Opinion for International Application No. PCT/CN2017/108344 dated Aug. 1, 2018.
International Search Report and Written Opinion dated Jul. 18, 2019 for International Application No. PCT/CN2018/118798.
International Search Report and Written Opinion dated Nov. 29, 2021 for International Application No. PCT/CN2021/114671.
International Preliminary Report on Patentability for International Application No. PCT/SG2016/050317 dated Jan. 18, 2018.
International Search Report and Written Opinion for International Application No. PCT/SG2016/050317 dated Oct. 18, 2016.
International Search Report with Written Opinion for International Application No. PCT/US2006/025562 dated Oct. 31, 2007.
International Search Report and Written Opinion for International Application No. PCT/US2005/034605 dated Jan. 26, 2006.
International Preliminary Report on Patentability for International Application No. PCT/US2010/056482 dated May 24, 2012.
International Search Report and Written Opinion for International Application No. PCT/US2010/056482 dated Mar. 14, 2011.
International Preliminary Report on Patentability for International Application No. PCT/US2011/026139 dated Sep. 7, 2012.
International Search Report and Written Opinion for International Application No. PCT/US2011/026139 dated Nov. 22, 2011.
International Search Report and Written Opinion for International Application No. PCT/US2011/034747 dated Jul. 28, 2011.
International Preliminary Report on Patentability for International Application No. PCT/US2012/023689 dated Aug. 15, 2013.
International Search Report and Written Opinion for International Application No. PCT/US2012/023689 dated Sep. 12, 2012.
International Search Report and Written Opinion for International Application No. PCT/US2012/060610 dated Mar. 29, 2013.
International Search Report and Written Opinion for International Application No. PCT/US2015/012463 dated May 13, 2015.
International Search Report and Written Opinion for International Application No. PCT/US2017/047905 dated Dec. 4, 2017.
[No Author Listed], Carbon Nanotubes for Electromagnetic Interference Shielding. SBIR/STTR. Award Information. Program Year 2001. Fiscal Year 2001. Materials Research Institute, LLC. Chu et al. Available at http://sbir.gov/sbirsearch/detail/225895. Last accessed Sep. 19, 2013.

(56) References Cited

OTHER PUBLICATIONS

[No Author Listed], High Speed Backplane Connectors. Tyco Electronics. Product Catalog No. 1773095. Revised Dec. 2008. 1-40 pages.
[No Author Listed], MCIO 124pos 85ohm. Amphenol Assembletech. 1 page. URL:http://www.amphenol-ast.com/v3/en/overview.aspx?classId=234 [retrieved on Apr. 11, 2022].
[No Author Listed], Military Fibre Channel High Speed Cable Assembly. www.gore.com. 2008. [last accessed Aug. 2, 2012 via Internet Archive: Wayback Machine http://web.archive.org] Link archived: http://www.gore.com/en.sub.--xx/products/cables/copper/networking/militar-y/military.sub.--fibre . . . Last archive date Apr. 6, 2008.
[No Author Listed], Mini Cool Edge IO—The Ideal Solution to Transmit Next Generation High-Speed Signal to Designated Area in Your System. Jul. 25, 2018. 2 pages. URL:https://www.amphenol-icc.com/connect/mini-cool-edge-io-the-ideal-solution-to-transmit-next-generation-high-speedsignal.html [retrieved on Apr. 11, 2022].
[No Author Listed], Mini Cool Edge IO Connector. Commercial IO. Amphenol ICC. 5 pages. URL:https://cdn.amphenol-icc.com/media/wysiwyg/files/documentation/datasheet/inputoutput/io_mini_cool_edge_io.pdf [retrieved on Apr. 11, 2022].
[No Author Listed], SFF-TA-1016 Specification for Internal Unshielded High Speed Connector System. Rev 0.0.1. SNIA SFF TWG Technology Affiliate. Nov. 15, 2019. 40 pages.
Beaman, High Performance Mainframe Computer Cables. 1997 Electronic Components and Technology Conference. 1997;911-7.
Reich et al., Microwave Theory and Techniques. Boston Technical Publishers, Inc. 1965;182-91.
Shi et al. Improving Signal Integrity in Circuit Boards by Incorporating Absorbing Materials. 2001 Proceedings. 51st Electronic Components and Technology Conference, Orlando FL. 2001:1451-56.
European Communication Pursuant to Article 94(3) EPC dated Sep. 8, 2022 for European Application No. 17930428.2.
International Preliminary Report on Patentability dated Feb. 28, 2023 for International Application No. PCT/CN2021/114671.
Taiwanese Office Action dated Jun. 16, 2022 for Taiwan Application No. 107138468.
Lu, Electrical Connector With a Housing Surrounded by a Shell With Surface Protrusions, U.S. Appl. No. 18/193,552, filed Mar. 30, 2023.
Lu, Electrical Connector With Segments Having Different Widths, U.S. Appl. No. 18/193,555, filed Mar. 30, 2023.
Lu, Multi-Width Electrical Connector With Recessed Neck Segment, U.S. Appl. No. 18/193,561, filed Mar. 30, 2023.
Sasame et al., Electrical connector with cavity between terminals, U.S. Appl. No. 17/942,435, filed Sep. 12, 2022.
U.S. Appl. No. 17/736,248, filed May 4, 2022, Lu et al.
U.S. Appl. No. 17/856,507, filed Jul. 1, 2022, Lu et al.
U.S. Appl. No. 17/867,067, filed Jul. 18, 2022, Hsu.
U.S. Appl. No. 17/942,435, filed Sep. 12, 2022, Sasame et al.
U.S. Appl. No. 18/193,552, filed Mar. 30, 2023, Lu.
U.S. Appl. No. 18/193,555, filed Mar. 30, 2023, Lu.
U.S. Appl. No. 18/193,561, filed Mar. 30, 2023, Lu.
EP 17930428.2, Sep. 8, 2022, European Communication.
TW 107138468, Jun. 16, 2022, Taiwanese Office Action.
PCT/CN2021/114671, Feb. 28, 2023, International Preliminary Report on Patentability.

* cited by examiner

123

HIGH-DENSITY EDGE CONNECTOR

CROSS-REFERENCE TO RELATED APPLICATIONS

This application is a 35 U.S.C. § 371 National Phase filing of International Application No. PCT/CN2018/118798, filed on Dec. 1, 2018, entitled "HIGH-DENSITY EDGE CONNECTOR," which claims priority to and the benefit of Chinese Patent Application Serial No. 201821637284.5, filed Oct. 9, 2018; Chinese Patent Application Serial No. 201821637282.6, filed Oct. 9, 2018; and Chinese Patent Application Serial No. 201821637283.0, filed Oct. 9, 2018. The entire contents of these applications are incorporated herein by reference in their entirety.

BACKGROUND

The technology described herein relates generally to electrical connectors used to interconnect electronic systems.

Electrical connectors are used in many ways within electronic systems and to connect different electronic systems together. For example, printed circuit boards (PCBs) can be electrically coupled using one or more electrical connectors, allowing individual PCBs to be manufactured for particular purposes and electrically coupled with a connector to form a desired system rather than manufacturing the entire system as a single assembly. One type of electrical connector is an "edge connector," which is a type of receptacle connector. An edge connector is often mounted to a first printed circuit board and has a mating interface with a slot into which a smaller printed circuit board, sometimes called a card, may be inserted. The edge connector has signal and ground contacts that line walls of the slot to mate directly to conductive pads near the edge of the card when inserted in the slot. In this way, signals, and their associated reference voltages, may pass between the PCB and the card. The card may have conductive pads, sometimes called "gold fingers", on one or both sides.

Some electrical connectors utilize differential signaling to transmit a signal from a first electronic system to a second electronic system. Specifically, a pair of conductors is used to transmit a signal. One conductor of the pair is driven with a first voltage and the other conductor is driven with a voltage complementary to the first voltage. The difference in voltage between the two conductors represents the signal. An electrical connector may include multiple pairs of conductors to transmit multiple signals. To control the impedance of these conductors and to reduce crosstalk between the signals, ground conductors may be included adjacent each pair of conductors.

As electronic systems have become smaller, faster, and functionally more complex, both the number of circuits in a given area and the operational frequencies have increased. Consequently, multiple requirements are imposed on connector designers to develop connectors that handle the transfer of data at high speeds without significantly distorting the data signals (via, e.g., crosstalk, or high insertion loss at some frequencies) using electrical contacts that have a high density (e.g., a pitch less than 1 mm, where the pitch is the distance between adjacent electrical contacts within an electrical connector). There are electrical as well as mechanical requirements, such as durability. Simultaneously satisfying all of the requirements can be difficult.

SUMMARY

According to some aspects, an electrical connector comprises: at least two signal terminals each comprising two longer electrical contacts and two shorter electrical contacts; at least two ground terminals disposed such that two or more of the at least two signal terminals are between two adjacent ground terminals of the at least two ground terminals; and two shields configured and arranged such that the two or more of the at least two signal terminals and the two adjacent ground terminals are between the at least two shields, with the two adjacent ground terminals contacting the two shields.

According to additional aspects, an electrical connector comprises: an insulative housing, comprising a mating interface comprising a slot; a plurality of signal terminals each comprising two longer electrical contacts and two shorter electrical contacts, the longer electrical contacts and the shorter electrical contacts comprising contact surfaces exposed to the slot; a plurality of ground terminals disposed such that signal terminals of the plurality of signal terminals are between two adjacent ground terminals of the at least two ground terminals; and two strips of lossy material electrically coupled to the plurality of ground terminals, wherein the plurality of signal terminals and plurality of ground terminals are arranged in a row parallel to the slot, and the two strips of lossy material extend in a direction parallel to the row on opposite sides of the at least two signal terminals and the at least two ground terminals.

According to further aspects, an electrical connector comprises: a housing comprising a mating face and a mounting face with a slot in the mating face; a plurality of longer electrical contacts; and a plurality of shorter electrical contacts, wherein: longer electrical contacts of the plurality of longer electrical contacts comprise a bottom portion, a middle portion, and a top portion, with the top portion comprising a surface exposed within the slot and the bottom portion extending from the mounting face of the housing; shorter electrical contacts of the plurality of shorter electrical contacts comprise a bottom portion, a middle portion, and a top portion, with the top portion comprising a surface exposed within the slot and the bottom portion extending from the mounting face of the housing; and the middle portion of the shorter electrical contacts of the plurality of shorter electrical contacts further comprise a twist.

According to some aspects, an electrical connector comprises: a housing including a plurality of channels that are equally spaced center-to-center from each other, wherein each of the plurality of channels is configured to receive either a signal terminal or a ground terminal; a plurality of signal terminals in channels of the plurality of channels; and a plurality of ground terminals in channels of the plurality of channels.

Additional aspects include a method of manufacturing an electrical connector, the method comprising: selecting, for each of a plurality of equally spaced channels in a housing of the electrical connector, from between a signal terminal and a ground terminal; and inserting the selected signal terminals and ground terminals into the plurality of channels.

The foregoing is a non-limiting summary of the invention, which is defined by the appended claims.

BRIEF DESCRIPTION OF DRAWINGS

The accompanying drawings are not necessarily drawn to scale. For the purposes of clarity, not every component may be labeled in every drawing. In the drawings.

DETAILED DESCRIPTION

Figure 1A:
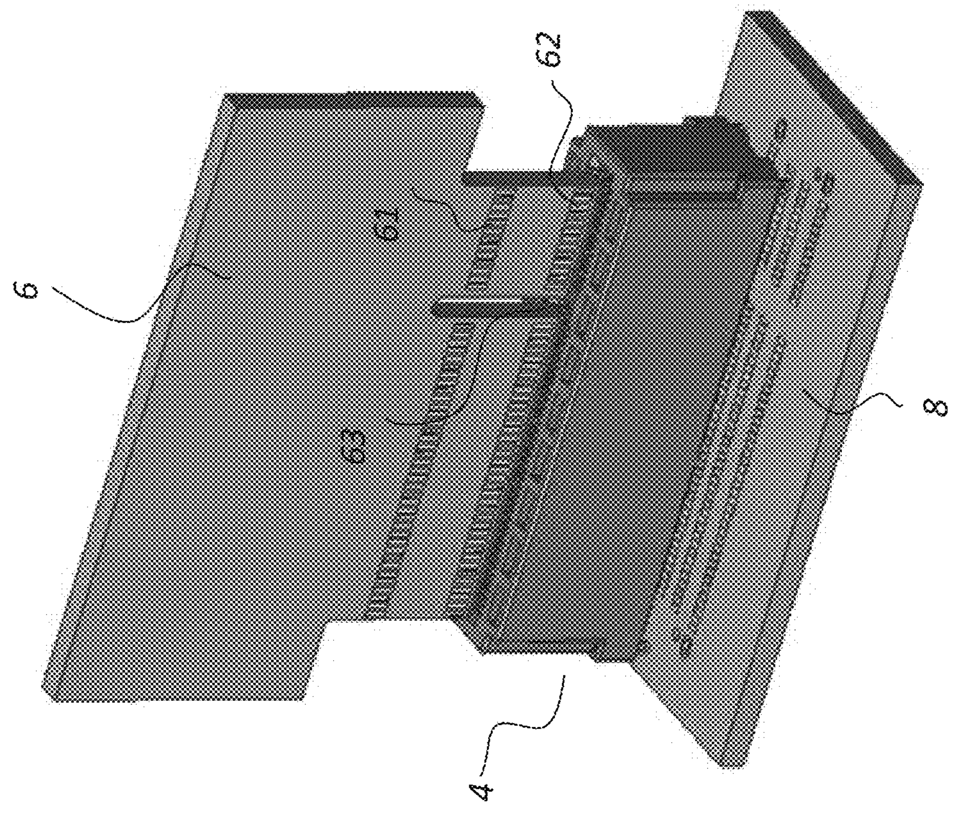
FIG. 1A is a perspective view of an exemplary PCB, high-density edge connector, and corresponding plug-in card of some embodiments.

The inventors have recognized and appreciated techniques for enabling compact, robust, high-density edge connectors operable at high frequencies. These techniques may be used separately or together in any suitable combination.

In one aspect, the inventors have recognized that increasing the number of signals passed through an edge connector by adding more terminals to the edge connector may undesirably result in a longer total length of the connector and a larger spatial structure of the product, which is disadvantageous for miniaturized and microminiaturized production. On the other hand, the inventors have recognized and appreciated that positioning existing connecting terminals closer together, so as to support miniaturized production, easily results in signal crosstalk and affects signal transmission quality.

In addition, for some connecting terminals, a gap provided between connecting terminals to receive a card may generally be slightly smaller than the thickness of the card, so that the card can be tightly held in the mating interface of the connector to ensure connection stability. However, the inventors have recognized and appreciated that this may cause a user to exert an undesirably large force when plugging or unplugging the card in the connector, causing external force that damages the terminals. As time passes, the gap may widen such that the card is only loosely held in the connector and the connector will thus fail to provide a stable connection.

The inventors have recognized and appreciated designs that can provide a high-density edge connector that also improves connection stability and transmission quality and reduces crosstalk. In some embodiments, a high-density edge connector may include connecting terminals that have longer contacts and shorter contacts, both with mating surfaces exposed in a slot of a mating interface of the connector. Such contacts may be positioned to mate with multiple rows of pads along an edge of a card inserted in the connector, which may provide a large number of interconnects, without requiring an increase in length of the connector.

One or more techniques may be used to prevent an undesirable level of crosstalk. Those techniques may include the use of ground terminals and signal terminals, which may be loaded into an insulative housing of the connector in any selected pattern in a row extending in an elongated dimension or direction of the slot of the mating interface. One such pattern, for all or portion of the connector, may entail positioning two signal terminals between two ground terminals. In some embodiments, the ground terminals may be connected with lossy strips, which improves high frequency performance. Alternatively or additionally, the ground terminals may be connected to shields, that extend in the row direction and are orthogonal to the ground terminals. In such a configuration, signal contacts in the two terminals may be bounded on at least two sides, and in some embodiments four sides, by grounded structures, which reduces crosstalk.

In some embodiments, the signal contacts may be configured as differential pairs. Those differential pairs may be broadside coupled differential pairs of signal contacts spaced apart in the row direction. In such a configuration, the longer and shorter contacts on each side of the slot may provide four differential pairs in the two signal terminals between adjacent ground terminals. Nonetheless, crosstalk may be low because of the grounded structures. Crosstalk may also be low because of differences in length of the longer and shorter contacts. The difference in length, for example, may provide a separation between contact surfaces between 6 mm and 9 mm.

In some embodiments, the contacts may be shaped to provide a low insertion force, thereby reducing the chances that a user will apply a damaging force when plugging or unplugging a card into the connector. Either or both of the longer and shorter contacts may include a twist that reduces the stiffness of the contact beam, reducing the insertion and retention force of the connector. In some embodiments, either or both of the longer and shorter contacts may include a primary elastic arm and a secondary elastic arm, which may be shaped to provide a desired insertion or retention force for that contact.

In some embodiments, a high-density edge connector may include connecting terminals that are spaced and shielding plates that are arranged on two sides of the connecting terminals and that fixedly connect the connecting terminals. The connecting terminals may comprise signal terminals located on the inner side, and two ground terminals located on the outer side and sandwiching the plurality of signal terminals therebetween, wherein the ground terminals are vertically connected to the shielding plates to position the plurality of signal terminals in a volume surrounded by the ground terminals and the shielding plates.

In some embodiments, each of the signal terminals and the ground terminals may comprise a first signal contact and a second signal contact having a length greater than a length of the first signal contact, the first signal contact and the second signal contact being arranged side by side and independent of each other. Additionally, a first contacting foot may be arranged at one end of the first signal contact, a first contact point may be arranged at the other end of the first signal contact, and a first twisted portion may be arranged between the first contacting foot and the first contact point. a second contacting foot may be arranged at one end of the second signal contact, a second contact point may be arranged at the other end of the second signal contact, and a second twisted portion may be arranged between the second contacting foot and the second contact point. Additionally, the bottom surface of the second contacting foot may be flush with the bottom surface of the first contacting foot, and the second contact point and the first contact point may protrude in the same direction.

Figure 1B:
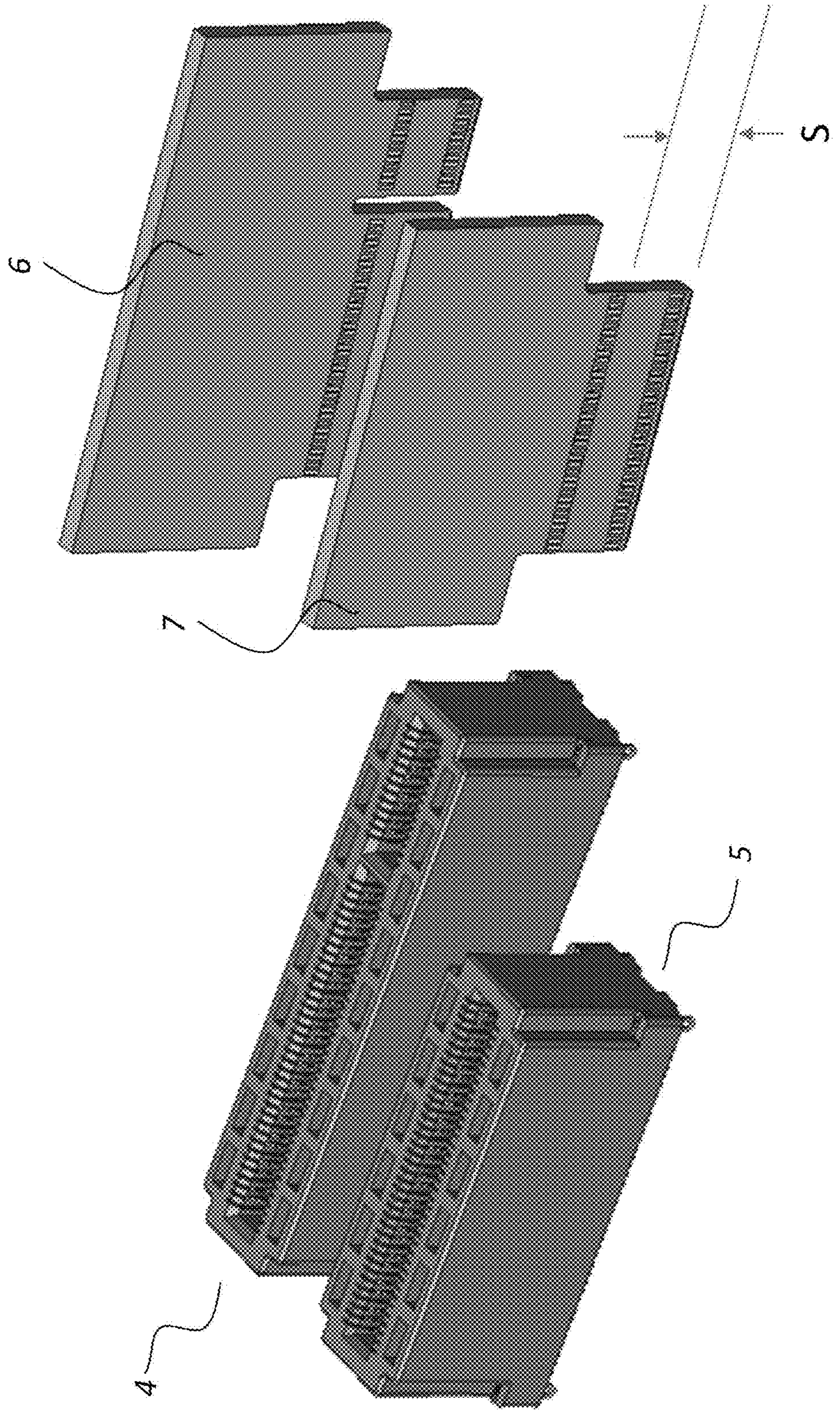
FIG. 1B is a perspective view of two alternative embodiments of high-density edge connectors and corresponding plug-in cards of some embodiments.

According to some embodiments, the shorter first signal contact and the longer second signal contact may be arranged such that one connecting terminal is provided with at least two contact points. In the case of the same number of connecting terminals, the transmission rate is doubled. That is, the number of contact points arranged on each row of connecting terminals may be upgraded from 2 to 4, which the inventors have appreciated can reduce the length of the product by about a half, thereby saving space and cost. FIG. 1A is a perspective view of an exemplary PCB 8, electrical connector 4, and corresponding plug-in card 6 of some embodiments. As can be seen on the visible side of plug-in card 6, there are two rows of terminals on the card 6 (spanning across key 63), including top row 61 and bottom row 62, which correspond to the connecting terminals in the connector 4. PCB 8 represents a portion of a printed circuit board to which electronic components may be attached to manufacture an electronic system. For simplicity of illustration, FIG. 1A illustrates the portion of the PCB eight containing the footprint for connector 4. In this example, the footprint contains four rows of pads to which the feet of signal contacts and ground terminals may be attached, such as by surface mount soldering. However, the conductive elements within connector 4 may be attached to PCB 8 in any suitable way. FIG. 1B is a perspective view of two exemplary embodiments of electrical connectors 4 and 5 and corresponding plug-in cards 6 and 7 of some embodiments. FIG. 1B illustrates that techniques as described herein may be applied in connectors of any of multiple configurations. Further, techniques as described herein may enable connectors to be simply assembled with different configurations of connecting terminals, which may be either signal terminals or ground terminals, to support different combinations of low-speed and high-speed signals. FIG. 1B also illustrates that techniques as described herein enable cards, such as cards 6 and 7 to have two rows of pads for mating with contacts inside their respective connectors 4 and 5. Those two rows may be separated by a distance S. Contact structures as described herein may enable the distance S to be large, such as greater than 6 mm or, in some embodiments, between 7 mm and 8.5 mm.

In some embodiments, each of the signal contacts of the connecting terminal may be generally of a sheet structure. Signal contacts may be repeatedly arranged side by side to form the connecting terminal. Such a configuration, for example, may be formed by stamping the conductive structures for a connecting terminal from a sheet of metal.

In actual operation, a narrow surface, formed by "length×thickness", of each signal contact is in contact with a card member. Since the thickness of the pin is smaller than its length and width, under the same conditions, a positive force (perpendicular to the contact surface, which can be understood as the intensity of pressure of the contact surface) formed between the contact and a mating pad on the card in the unit contact area will be larger. As described above, the inventors have recognized and appreciated that, when increasing density such as by providing two rows of contacts, a large external force may be required for plugging and unplugging, which may cause a user to exert an undesirably large force during the process of plugging, and may cause sufficient force to damage the terminals. As time passes, the gap may become loose, thus failing to achieve stable connection.

The inventors have recognized and appreciated that some embodiments may alleviate this problem, with the first signal contact and the second signal contact provided with the first twisted portion and the second twisted portion, respectively. The twisted portions (including the first twisted portion and the second twisted portion) divide the signal contacts (including the first signal contact and the second signal contact) into two portions. The planes where the two portions are located intersect with each other such that a narrow contact surface formed by "length×thickness" is replaced with a wide contact surface formed by "length×width" on the upper half of each signal contact, to reduce the positive force on the upper part of the pin body.

Further, by twisting, the stiffness of the signal contact may be reduced, in some embodiments, which may reduce the insertion and retention force. The twist, for example, may be 90 degrees +/−5 degrees (i.e., the twist may be between 85 and 95 degrees). A contact may be stamped from a sheet such that a surface of the sheet is perpendicular to the direction in which the contact must deflect for mating. If the mating surface is on an edge of the contact perpendicular to the surface, at the bottom portion of the contact, such as at the foot for mounting to the printed circuit board, that surface may be perpendicular to the direction of beam motion, creating a stiff beam. As a result of the twist in a middle portion of the contact, at the upper portion of the contact, where the contact surface is located, that surface may be parallel to the elongated direction of the slot into which a mating card will be inserted, creating a less stiff beam. Therefore, twisting the contact so that the surface of the sheet from which the contact is stamped is parallel to the elongated direction of the slot into which a mating card will be inserted, a less stiff beam results.

Therefore, the external force for plugging or unplugging required by the user to overcome the positive force is reduced to provide convenience for the user to plug in.

In some embodiments, shorter electrical contacts may include a first surface that is within 5 degrees of perpendicular to the elongated direction of the slot at the bottom portion of the respective shorter electrical contact, and that is within 5 degrees of parallel to the elongated direction of the slot at the top portion of the respective shorter electrical contact. In some embodiments, the first surface at the top portion of the shorter electrical contacts may comprise the mating surface.

In some embodiments, the slot may have a given insertion direction. Additionally, the top portion of the longer electrical contacts may comprise a mating surface, and the mating surfaces of the shorter electrical contacts and of the longer electrical contacts may be separated in the insertion direction by between 6 and 9 millimeters.

In some embodiments, the longer electrical contacts may comprise a second surface, which may be within 5 degrees of perpendicular to the elongated direction of the slot at the bottom portion of the respective longer electrical contact, and may be within 5 degrees of perpendicular to the elongated direction of the slot at the top portion of the respective longer electrical contact.

In some embodiments, the slot may comprise a first side wall and a second side wall opposing the first side wall, with a first portion of the longer electrical contacts disposed adjacent the first side wall, with a second portion of the longer electrical contacts disposed adjacent the second side wall, and with a first portion of the shorter electrical contacts disposed adjacent the first side wall, and a second portion of the shorter electrical contacts disposed adjacent the second side wall.

According to some embodiments, the ground terminals and the shielding plates may be arranged around the signal terminals to take a desired shielding effect on signal transmission and eliminate the crosstalk caused by signal differentials on two sides of the signal terminals for transmitting data to the greatest extent, thereby achieving a desired signal integrity performance. Through simulation analysis, the high-density connecting subassembly of some embodiments can achieve a transmission rate of 32 G bps.

The inventors have also recognized and appreciated that a high-density edge connector according to some embodiments can provide greater flexibility in terms of use cases. For example, ground terminals can be used in some channels in the connector housing that would normally contain signal terminals. Alternatively or additionally, a low speed terminal may become a high speed terminal by adding conductive plastic (e.g., lossy elements, described further below) on the connector housing.

In some embodiments, a distance between the first contact point and the second contact point may be between 6 mm and 9 mm. For example, in some embodiments, a distance between the first contact point and the second contact point is 7 mm to 8.5 mm.

According to some embodiments, the distance between the first contact point and the second contact point for transmitting signals is set to be in such a range to ensure the desired signal integrity performance, thereby avoiding a large product structure owing to a too large distance therebetween or large signal crosstalk owing to a too small distance therebetween. Within the range from 7 mm to 8.5 mm, the transmission quality and product size can be balanced.

Further, in some embodiments, the twisted angles of the first twisted portion and the second twisted portion are 45 degrees to 135 degrees respectively.

In some embodiments, the twisted angles may have a range from 45 degrees to 135 degrees, such that the upper part (a contact surface portion) of the twisted signal contact can make line contact with the card as much as possible to ensure the transmission quality, thereby preventing a point contact between the contact surfaces (including the first contact surface and the second contact surface) and the card (due to too large or too small twisted angles), which might affect the transmission quality.

It should be noted that a "mating surface" may be shaped to create contact in ways including but not limited to contact at a point, along a line or over a broader area. That is, a mating surface may have a structure that is raised for forming a point contact, a line contact, or contact over a broader surface.

Further, in some embodiments, the twisted angles of both the first twisted portion and the second twisted portion are 90 degrees. Under the twisted angles of 90 degrees, the mating surface at the upper part of the twisted body of the signal contact may be completely fitted to the card member to form a line contact or a surface contact.

Further, in some embodiments, the first contacting foot and the second contacting foot are inverted T-shaped and L-shaped respectively, or may also be in other shapes, such as a transverse line segment or a pressfit. Those skilled in the art can make any reasonable modifications under the teachings herein.

Further, in some embodiments, the surface of each of the signal terminals may be covered with an insulating sheet, and the insulating sheet may cover a portion between the first mating surface and the first contacting foot and a portion between the second mating surface and the second contacting foot. The insulating sheet may hold signal contacts as part of the signal terminal.

According to some embodiments, the insulating sheet can isolate a signal channel between adjacent signal terminals and avoid mutual crosstalk. In addition, due to the presence of the insulating sheet, a plurality of signal terminals can be directly stacked together, which facilitates the positioning and assembly of the terminals, and at the same time achieves the purposes of modular design, that is, flexible production according to customer requirements and cost saving.

Further, in some embodiments, the second signal contact, which may be a longer signal contact in a signal terminal, comprises a supporting arm and an elastic arm that is connected to the supporting arm and bent relative to the supporting arm. The second contacting foot is arranged at an end, away from the elastic arm, of the supporting arm, and the second mating surface is arranged on the elastic arm.

Further, in some embodiments, the elastic arm comprises a primary elastic arm and an secondary elastic arm, wherein the primary elastic arm and the secondary elastic arm are connected to the supporting arm respectively, extend from their respective connection parts with the supporting arm in a direction away from the supporting arm and are spaced from each other. The second mating surface is arranged on one side, away from the secondary elastic arm, of the primary elastic arm.

Further, in some embodiments, the shielding plates comprise main bodies and installation grooves formed in the main bodies, and the ground terminals are clamped in the installation grooves.

The shielding plate is connected with the ground terminal on the outer side through the installation groove in clamping manner, which is very convenient for production and assembly, and is beneficial to mass production of the product.

Further, in some embodiments, the installation groove comprises a strip-shaped clamping slot and at least two transverse slots intersected with the clamping slot. The transverse slots are communicated with the strip-shaped clamping slot, and a plurality of protrusions is formed at the intersections of the transverse slots and the strip-shaped clamping slot. These protrusions may be deflected when a ground terminal is inserted in the installation groove, exerting pressure to clamp the ground terminal in the installation groove.

According to some embodiments, the transverse slots that intersect with the clamping slot are additionally arranged on the basis of the clamping slot, and a plurality of protrusions are formed on the intersection therebetween. Therefore, after the ground terminals are clamped into the clamping slot, the shielding plates and the ground terminals are connected tightly through the protrusions, to ensure that the shielding plates are sufficiently connected to the ground terminals. With the protrusions, it is possible to not only avoid the difficulty in plugging and assembling caused by an interference fit between the clamping slot and the ground terminals but also to avoid poor contact caused by a clearance fit between the clamping slot and the ground terminals. According to some embodiments, the protrusions are arranged in the installation groove to facilitate the assembly, and also ensure the tight connection between the ground terminals and the shielding plates and the signal transmission quality.

Further, in some embodiments, the transverse slots are perpendicular to the clamping slot. The transverse slot is U-shaped. Also, it may be in the shape of a transverse line segment or T-shaped, and those skilled in the art can make any reasonable modifications under the teachings herein. In the meantime, the number of clamping slots is at least 2, which may be 3, 4, 5, or even more.

A high-density edge connector comprises a housing and a plurality of said connecting terminals which are arranged in the housing in a row. In some embodiments, the housing may contain a plurality of channels into which the connecting terminals may be inserted. The channels and connecting terminals may be configured such that either a signal terminal or ground terminal may be inserted in any channel. As a result, the row may contain any desired pattern of signal terminals and ground terminals.

Further, in some embodiments, the shielding plates of two adjacent connecting subassemblies are connected with each other.

The connecting terminals of some embodiments are simple in structure and stable in transmission performance, and capable of achieving higher-efficiency transmission of signals, avoiding signal crosstalk among the connecting terminals, achieving higher transmission efficiency in the case of the same connection length and saving a structural space of the product. In the meantime, connecting terminals of some embodiments provide a mating interface into which it is easy for the user to plug or unplug a card.

Figure 1C:
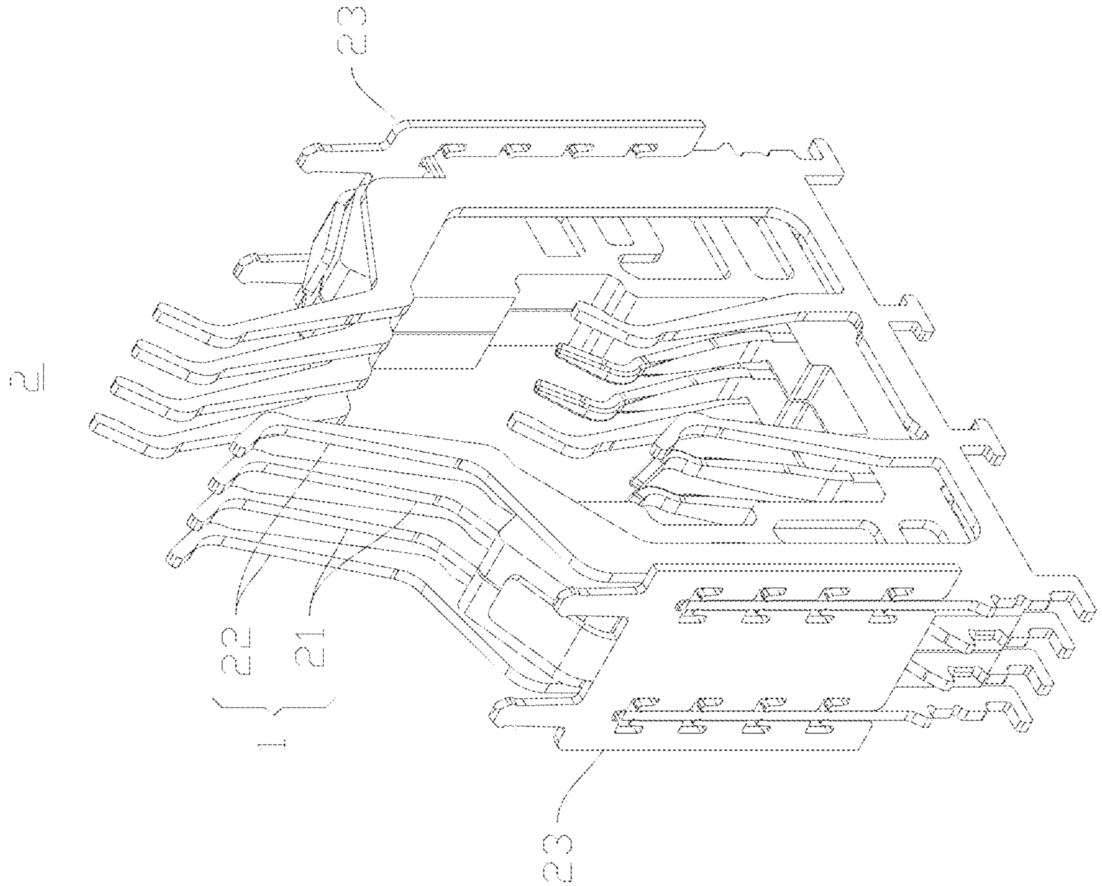
FIG. 1C is a perspective view of a connecting subassembly of some embodiments.
Figure 2:
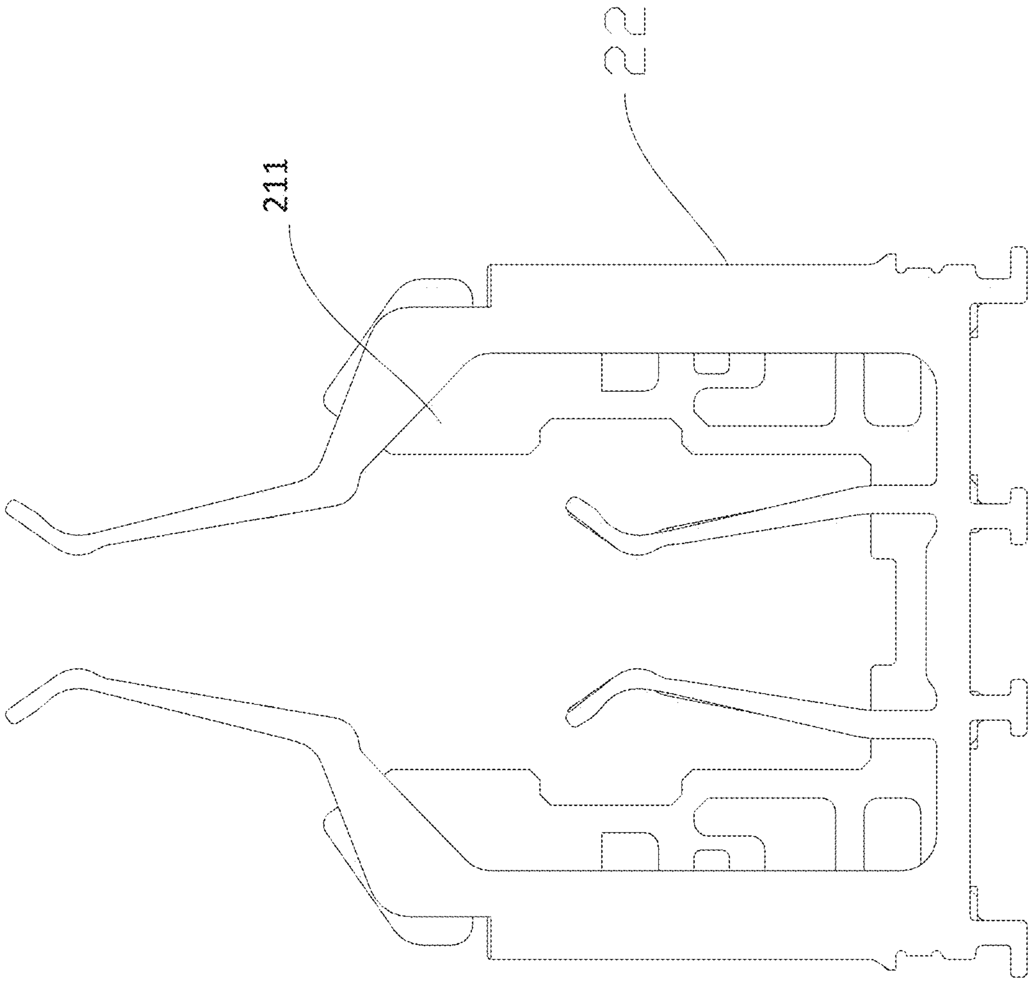
FIG. 2 is an end view of a portion of a connecting subassembly with a ground terminal at the end of the portion.
Figure 3:
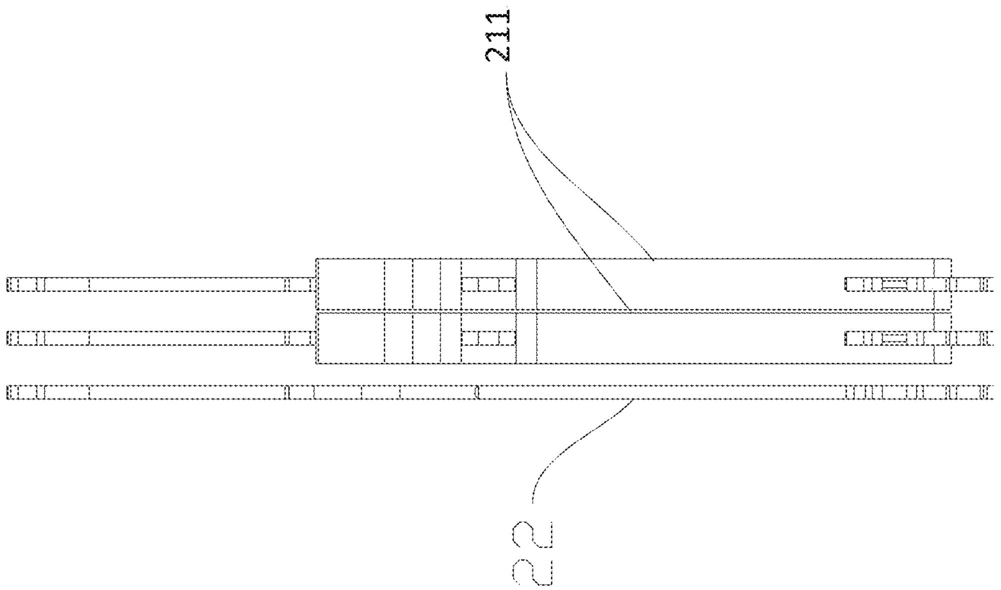
FIG. 3 is a partial bottom view of a connecting subassembly of some embodiments.
Figure 4:
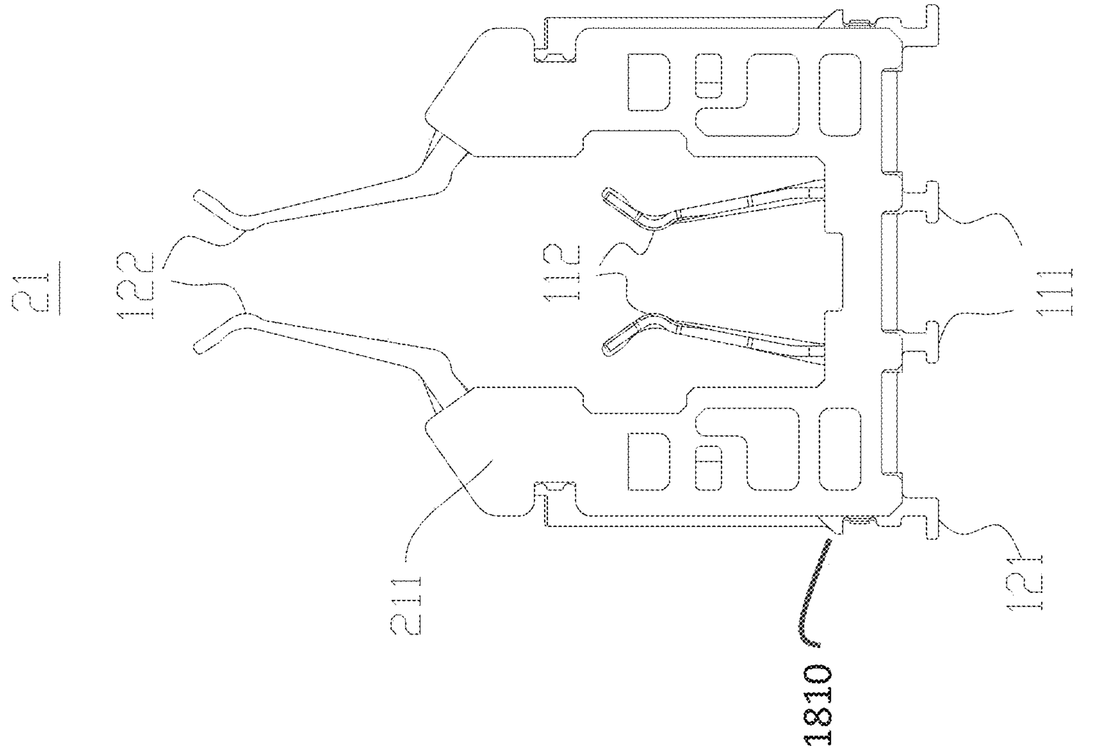
FIG. 4 is an end view of a portion of a connecting subassembly with a signal terminal at the end.

With reference to FIGS. 1C-4, a high-density connecting subassembly 2 of some embodiments comprises a plurality of connecting terminals 1 which is arranged at intervals and shielding plates 23 which are arranged at two sides of the connecting terminals 1 and fixedly connect the plurality of connecting terminals 1. In some embodiments, a connecting subassembly 2 may be inserted into an insulative housing to form a connector. FIG. 1C illustrates a connecting subassembly with four connecting terminals, here shown as two signal terminals and two ground terminals. It should be appreciated that any suitable number and type of connecting terminals may be used in a subassembly. Further, it is not a requirement that the terminals be fixed to one another before insertion into a connector housing. The connecting terminals, for example, may be inserted singly, or in groups of any size, into the housing.

With reference to FIGS. 1C-4, the connecting terminals 1 comprise a plurality of signal terminals 21 located at an inner side, and two ground terminals 22 that are located at an outer side and that sandwich the plurality of signal terminals 21 therebetween. The ground terminals 22 may be vertically connected with the shielding plates 23 so as to restrict the plurality of signal terminals 21 into a volume surrounded by the ground terminals 22 and the shielding plates 23.

The number of the signal terminals 21 is plural, such as two, three, four, five or more, which may be arranged according to the type of a transmission signal during specific application. For example, when the transmission signal is a differential signal, there are two signal terminals which form a positive-negative differential pair. In some embodiments, corresponding electrical contacts in the first signal terminal and the second signal terminal may form broadside coupled differential pairs. Alternatively or additionally, electrical contacts in the first signal terminal and the second signal terminal may form differential pairs, and each first and second signal terminal may be bounded on four sides—for example, on a first side by a first ground terminal of the at least two ground terminals, on a second side, parallel to the first side, by a second ground terminal of the at least two ground terminals, on a third side, orthogonal to the first side, by a first shield of the two shields, and on a fourth side, parallel to the third side, by a second shield of the two shields, such that the differential pairs are bounded on four sides by ground conductors.

As shown in FIG. 1C, in this embodiment, there are two signal terminals 21. The ground terminals 22 are respectively arranged at two sides of the signal terminals 21. However, it should be appreciated that ground terminals 22 may be interspersed with signal terminals 21, such as to create a pattern of signal and ground terminals which may repeat along the length of the connector.

Figure 5:
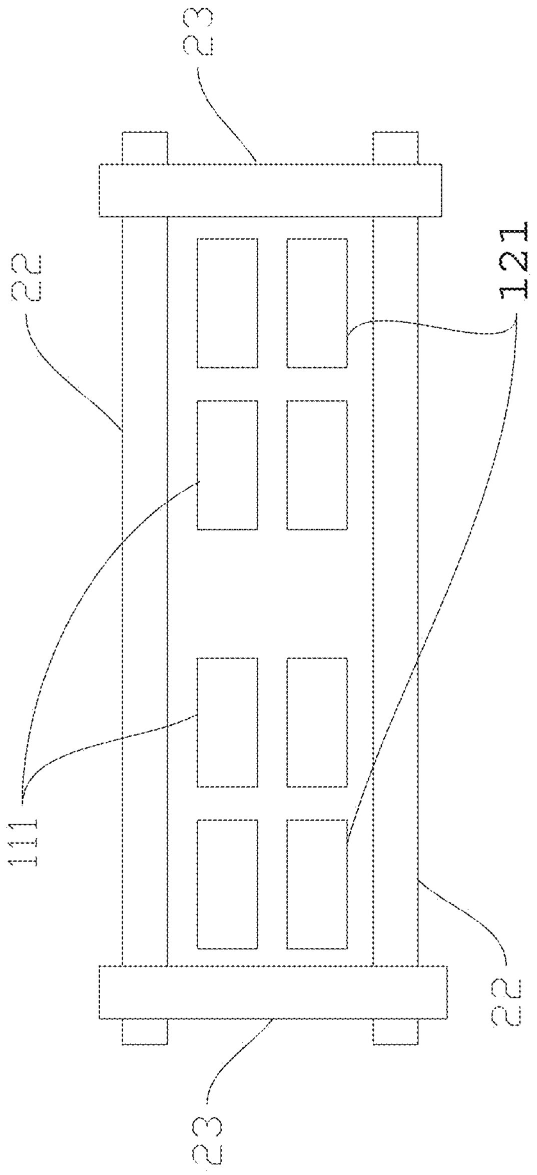
FIG. 5 is a structural diagram of the bottom of a connecting subassembly of some embodiments.

Two ends of the ground terminals 22 at two sides are respectively connected through shielding plates 23. The two shielding plates 23 and the two ground terminals 22 bound a rectangular space. As shown in FIG. 5, the two signal terminals 21 are accommodated in the rectangular space. The signal terminals 21 are enclosed on four sides, which avoids signal crosstalk and improves signal integrity. It should be appreciated that in embodiments in which a subassembly 2 includes more than two ground terminals, shielding plates 23 may be configured with openings to engage more than two ground terminals. A length of the shielding plate 23 with only two openings for receiving edges of ground terminals is shown for simplicity in FIG. 1C, but some embodiments will include shielding plates of longer length.

Figure 6A:
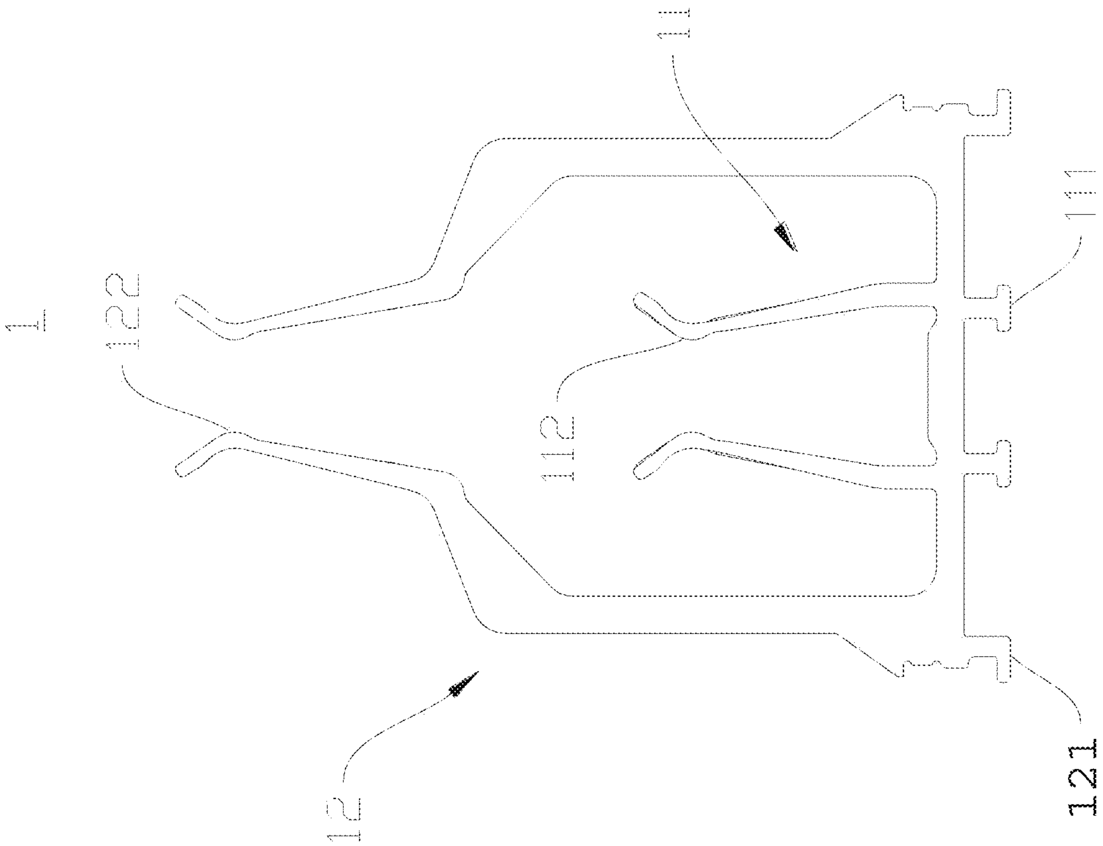
FIG. 6A is a plan view of a lead frame for a connecting terminal of some embodiments, before individual contacts are severed.

With reference to FIG. 6A, each signal terminal 21 comprises a first signal contact 11 and a second signal contact 12 longer than the first signal contact 11. The first signal contact 11 and the second signal contact 12 are arranged side by side and are shown connected with each other. In some embodiments ground terminal 22 may similarly include shorter and longer contacts, such as two of each. In a ground terminal 22, the shorter and longer contacts may be electrically and mechanically joined by a web of the sheet of material from which the ground terminal is stamped (e.g., the contacts may be integral with the ground terminal 22). In a signal terminal (e.g., 21), the shorter and longer contacts may be severed from that web of material, so as to be isolated from one another within the signal terminal and within the connector. For example, the shorter and longer contacts may be uncoupled within the connector.

Figure 6B:
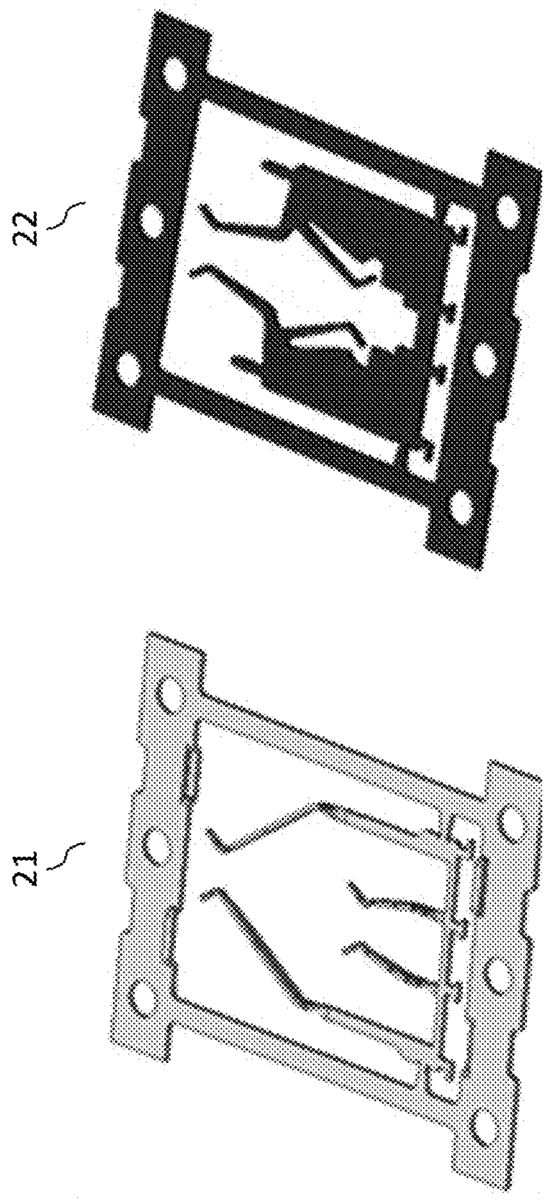
FIG. 6B are perspective views of lead frames for two types of connecting terminals of some embodiments.

Signal and ground terminals may have other shapes. FIG. 6B shows two types of connecting terminals of some embodiments, including a signal terminal 21 and a ground terminal 22, each still including carrier strips and tie bars. These elements remain from the sheet of metal from which the terminals are stamped. The ground terminals may be severed from the carrier strips by cutting the type bars before installation in a connector. The signal contacts may be overmolded with an insulative material to hold them together before the tie bars holding the signal contacts together are severed. In embodiments in which the contacts are twisted or otherwise formed those operations may be performed before over molding or, for portions of the contacts outside of the overmolded, those operations may be performed after over molding. Other operations may be performed on the contacts either before or after overmolding. In some embodiments, contact surfaces may be coated, such as with gold or other metal that resists oxidation, and such a coating may be applied either before or after over molding. In some embodiments, the connecting terminals may further comprise a third signal contact, a fourth signal contact, a fifth signal contact, . . . , and an n-th signal contact, which are increased in length in sequence, and are respectively provided with a third mating surface, a fourth mating surface, a fifth mating surface, . . . , and an n-th mating surface, thereby obtaining a plurality of signal contacts and thus improving the transmission efficiency. In view of producing and processing difficulties and costs, there are four signal contacts preferably, namely, two first signal contacts and two second signal contacts as shown in the figures. As a result there may be two longer and two shorter signal contacts per signal terminal and ground terminals with four mating surfaces that align with the mating surfaces of the signal contacts.

Figure 7:
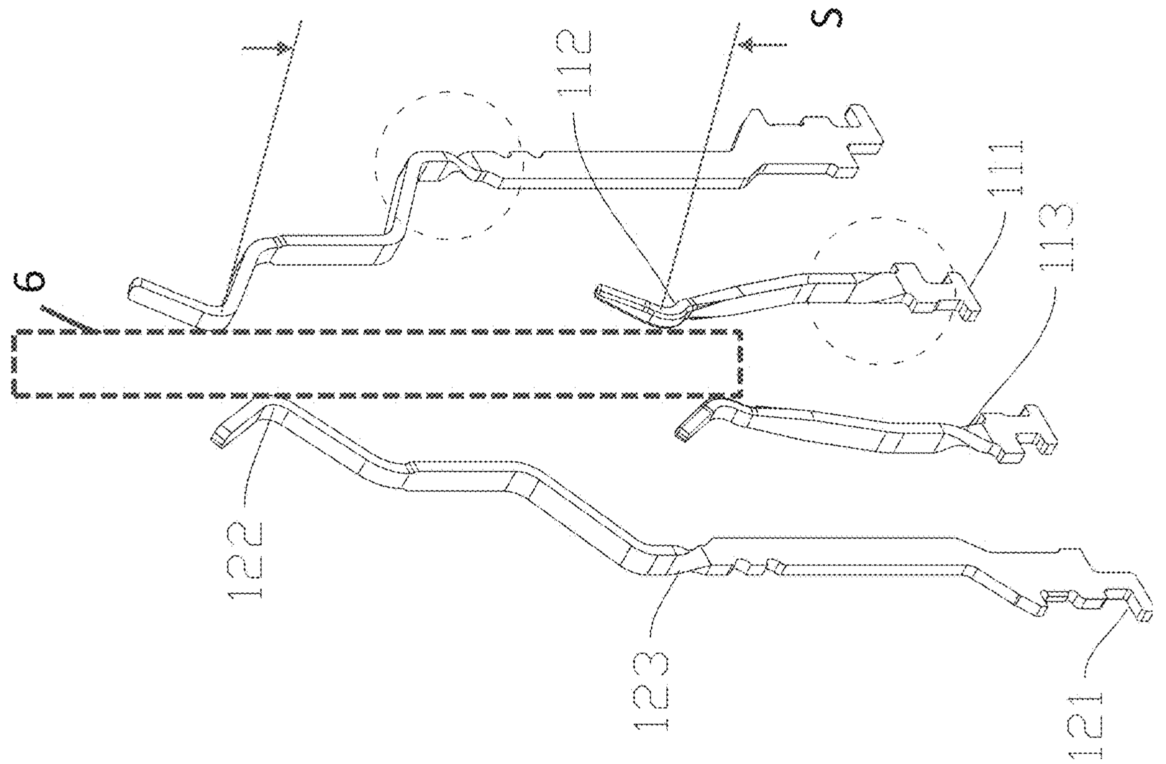
FIG. 7 is a perspective view of the contacts of a signal terminal, with insulative portions cut away, according to some embodiments.
Figure 8:
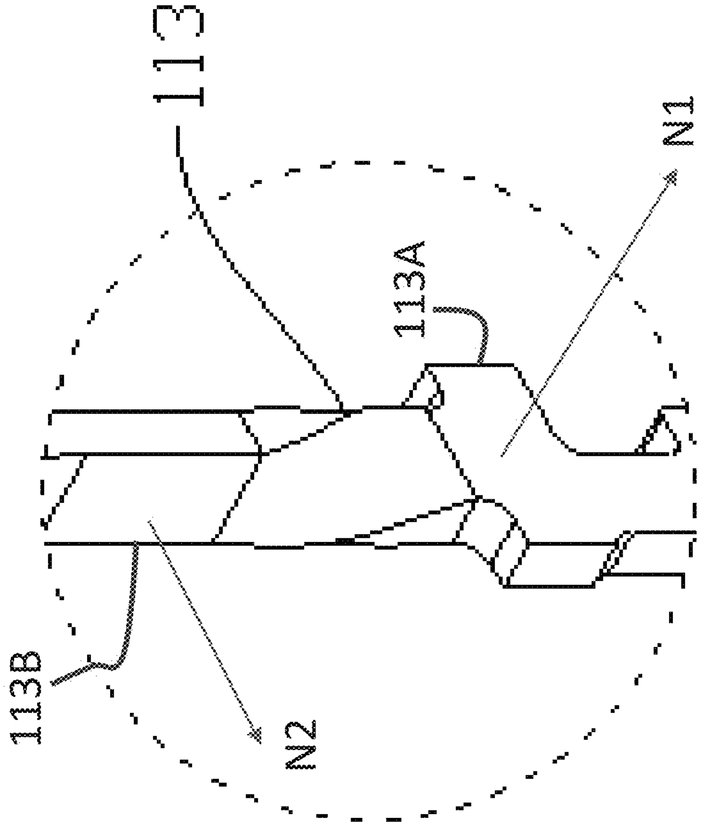
FIG. 8 is a partial enlarged view of a twist in a shorter contact of a connecting terminal of some embodiments.

With reference to FIGS. 7 and 8, the first signal contact 11 is provided with a first contacting foot 111 at one end and a first contact 112 at the other end, and a first twisted portion 113 is arranged between the first contacting foot 111 and the first contact 112. The twisted angle of the first twisted portion 113 is 45-135 degrees. Preferably, the twisted angle may be 45 degrees, 80 degrees, 90 degrees or 120 degrees. More preferably, the twisted angle of the first twisted portion is 90 degrees (plus or minus 5 degrees in some embodiments).

FIG. 8 illustrates a twist of 90 degrees. A surface of portion 113A has a normal N1. After the twisted portion 113, portion 113B has a normal N2. In the embodiment illustrated, N2 is rotated 90 degrees with respect to N1.

Figure 9:
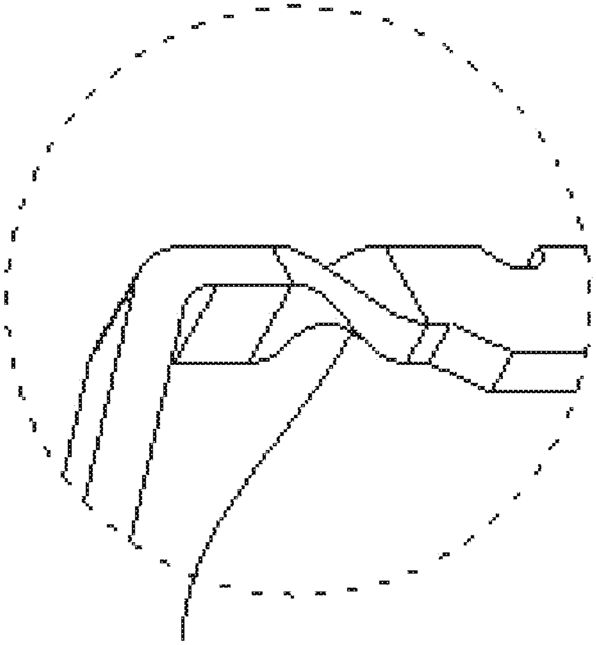
FIG. 9 is a partial enlarged view of a twist in a longer contact of a connecting terminal of some embodiments.

With reference to FIGS. 7 and 9, the second, longer signal contact 12 is provided with a second contacting foot 121 at one end and a second mating surface 122 at the other end. A bottom surface of the second contacting foot 121 is flushed with the bottom surface of the first contacting foot 111, and the protrusion directions of the second mating surface 122 and the first mating surface 112 are the same. The second signal contact 12 further comprises a second twisted portion 123. The second twisted portion 123 is arranged between the second contacting foot 121 and the second mating surface 122. The twisted angle of the second twisted portion 123 is 45-135 degrees. Preferably, the twisted angle may be 45 degrees, 80 degrees, 90 degrees or 120 degrees. More preferably, the twisted angle of the second twisted portion 123 is 90 degrees. In this embodiment, the twisted directions of the first twisted portion 113 and the second twisted portion 123 are opposite. In this way, opposing contacts, positioned on opposite sides of a slot of a mating interface, are the mirror images of one another.

For example, according to some embodiments, an electrical connector may comprise: a housing comprising a mating face and a mounting face with a slot in the mating face; a plurality of longer electrical contacts; and a plurality of shorter electrical contacts. Additionally, longer electrical contacts may comprise a bottom portion, a middle portion, and a top portion, with the top portion comprising a surface exposed within the slot and the bottom portion extending from the mounting face of the housing. Additionally, shorter electrical contacts may comprise a bottom portion, a middle portion, and a top portion, with the top portion comprising a surface exposed within the slot and the bottom portion extending from the mounting face of the housing. Additionally, the middle portion of the shorter electrical contacts may further comprise a twist, such as is discussed above. In some embodiments, the middle portion of the shorter electrical contacts may be elongated along an axis parallel to a first direction, and the twist may be about that axis.

Longer signal contact 12 has one or more bends so as to align contact surface of the longer and short contacts on each of the signal terminal so as to make contact with pads on a surface of a card 6.

A distance S between the first mating surface 112 and the second mating surface 122 is 7-8.5 mm. Preferably, the distance between the first mating surface 112 and the second mating surface 122 is 7 mm, 6 mm, 8 mm or 8.5 mm. The first contacting foot 111 and the second contacting foot 121 are inverted T-shaped and inverted L-shaped respectively.

Figure 10:
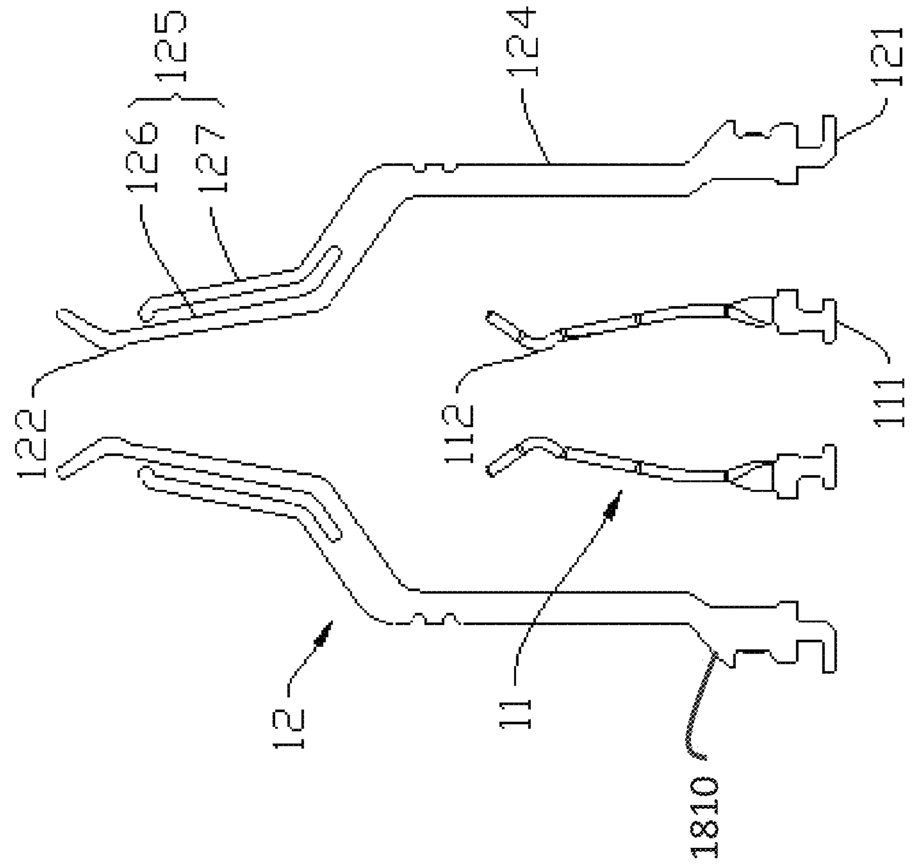
FIG. 10 is a plan view of contacts of a signal terminal, with insulative portions cut away, according to some embodiments.

FIG. 10 shows another embodiment of contacts in a signal terminal. The second signal contact 12 may comprise a supporting arm 124 and an elastic arm 125 which is connected with the supporting arm 124 and inclined relative to the supporting arm 124. The second contacting foot 121 is arranged at the end, away from the elastic arm 125, of the supporting arm 124. The second contact 122 is arranged on the elastic arm 125.

The elastic arm 125 comprises a primary elastic arm 126 and a secondary elastic arm 127. Both the primary elastic arm 126 and the secondary elastic arm 127 are connected with the supporting arm 124. Both the primary elastic arm 126 and the secondary elastic arm 127 extend towards the direction, away from the supporting arm 124, from their connecting positions with the supporting arm 124, and are spaced from each other. The second contact 122 is arranged at the side, away from the secondary elastic arm 127, of the primary elastic arm 126. Preferably, the length of the primary elastic arm is greater than the length of the secondary elastic arm, which facilitates plugging and unplugging in use. FIG. 10 illustrates split arms with primary and secondary elastic arms only on the longer contacts and only for signal contacts. Such a technique, however, may be used for the shorter signal contacts and may be used with the portions of the ground terminals that act as beams, generating spring force on the mating surfaces of the ground terminals.

In this embodiment, the upper portion of the second signal contact 12 is designed to be two separate parts, i.e., the primary elastic arm 126 and the secondary elastic arm 127. In this way, a positive force generated by the second signal contact, as well as characteristic impedance of the signal contact itself, may be reduced. Thus, a user may perform insertion easily. Since there is a gap between the primary elastic arm 126 and the secondary elastic arm 127, one end thereof may be fixed and the other end are independent of each other. This may further alleviate yielding and prolong the service life of a connector.

In some embodiments, In some embodiments, the top portion of the longer electrical contacts may comprise an edge perpendicular to the first surface and a mating surface on the edge. Additionally, the top portion of the longer electrical contacts may comprise a primary elastic arm and secondary elastic arm.

With reference to FIG. 4 again, the surface of the signal terminal 21 is covered with an insulating sheet 211. The insulating sheet 211 covers a portion between the first mating surface 112 and the first contacting foot 111 as well as a portion between the second mating surface 122 and the second contacting foot 121. The insulating sheet 211 may be overmolded on the signal contacts, holding the signal contacts together.

Figure 11A:
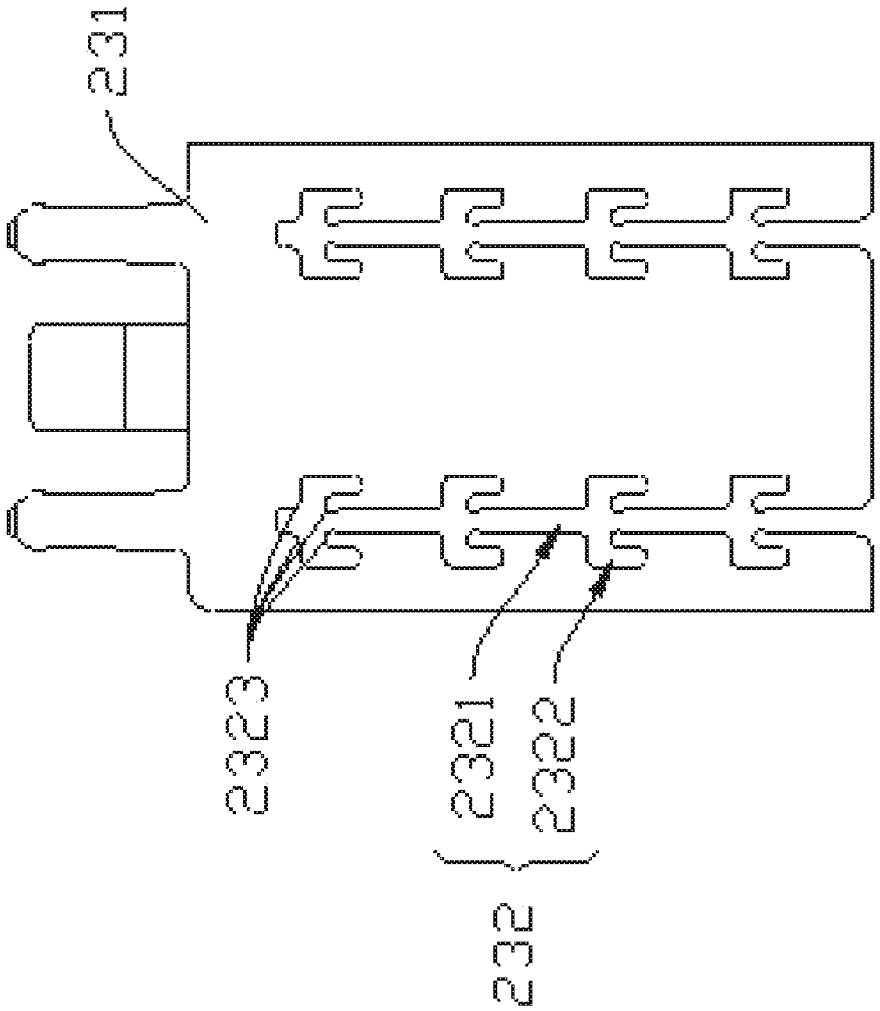
FIG. 11A is a plan view of a portion of a shielding plate of a connecting subassembly of some embodiments.
Figure 11B:
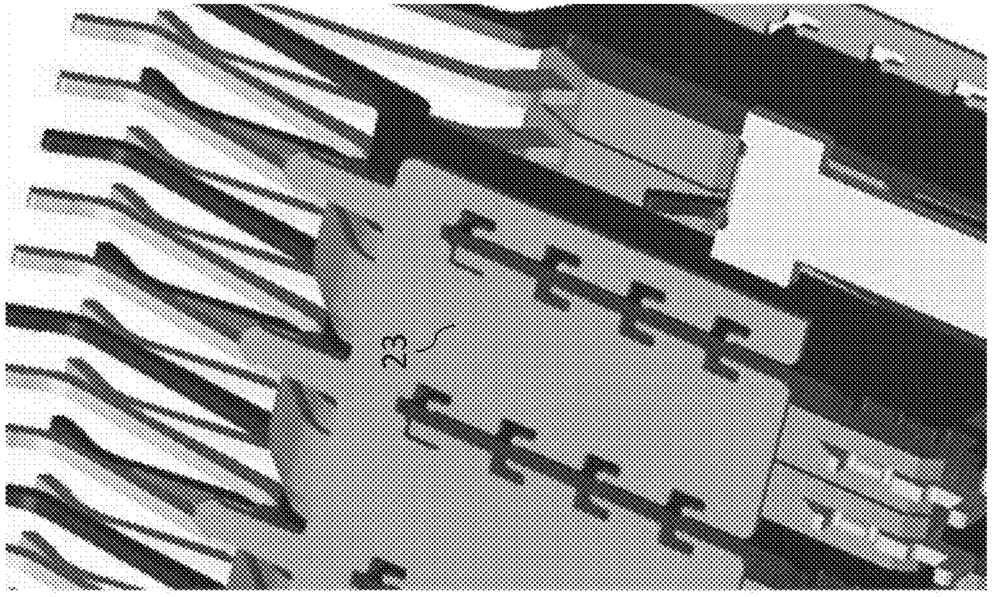
FIG. 11B is a partial enlarged perspective view of a connecting subassembly with a shielding plate contacting two ground terminals with two signal terminals between the ground terminals, in accordance with some embodiments.

With reference to FIGS. 11A-B, the shielding plate 23 comprises a main body 231 and an opening, such as an installation groove 232 formed in the main body 231. The ground terminal 22 may be clamped in the installation groove 232. As can be seen, for example, in FIG. 1C, an edge portion of the ground terminals extends into a corresponding installation groove 232.

The installation groove 232 comprises a strip-shaped clamping slot 2321 and at least two transverse slots 2322 intersected with the clamping slot 2321. The transverse slots 2322 are communicated with the strip-shaped slot, and a plurality of protrusions 2323 is formed at the intersections. The transverse slot 2322 is perpendicular to the clamping slot 2321 and the transverse slots 2322 is U-shaped. As shown in FIG. 11A, in this embodiment, the number of the transverse slots 2322 corresponding to each strip-shaped clamping slot 2321 is four and the number of the protrusions 2323 formed at the intersection is four, so that the shielding plate 23 is in four-point contact with the ground terminal 22 at each intersection. Of course, in the other embodiments of some embodiments, the number of the transverse slots 2322 may be two, three, five or more and may be determined by a person skilled in the art according to practical situations. Likewise, the shape of the transverse slot 2322 may be changed by a person skilled in the art in addition to the U shape shown in the figures. For example, it may also be shaped like the Chinese character: 米 or linear or shaped like the Chinese character: 八, and a different number of protrusions is correspondingly obtained at intersections. For example, the shielding plates 23 may comprise six or more protrusions 2323 extending into the installation grooves 232. In some embodiments, the protrusions 2323 may comprise at least four protrusions configured to contact and apply pressure against a respective ground terminal 22.

In some embodiments, shields may each include a shielding plate 23, which may include the openings extending along a first axis in the shielding plate 23. Additionally, each opening may receive an edge of a respective ground terminal orthogonal to the shielding plate 23. The shielding plate 23 may also include two or more (e.g., four) portions protruding into the openings so as to contact and apply pressure against the respective ground terminal 22. Additionally, the shields may include at least one first portion extending from the shielding plate 23 and bent to conform to a bend in a longer electrical contact. In some embodiments, the at least one first portion may be between adjacent openings. In some embodiments, the openings may be spaced center-to-center to fit four signal terminals between adjacent openings.

Figure 12:
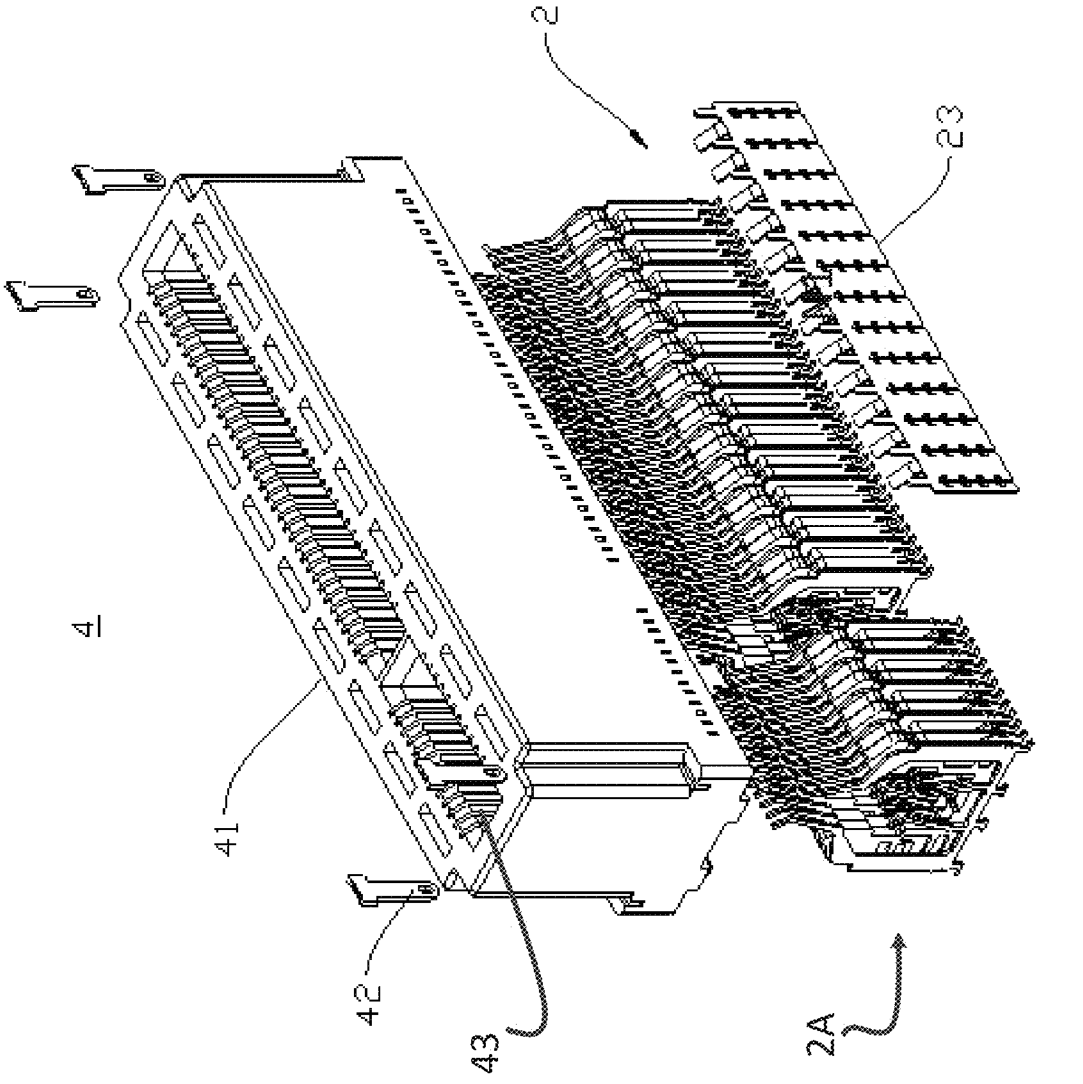
FIG. 12 is an exploded view of a connecting subassembly of some embodiments.

With reference to FIG. 12, a high-density edge connector 4 of some embodiments comprises a housing 41 and a plurality of above connecting assemblies 2. The plurality of connection subassemblies 2 is arranged in a row and is inserted in the housing 41. The connecting subassembly 2 is fixedly connected with the housing 41. It should be appreciated that the connector 4 may be assembled in any suitable order. Contacting terminals may be aligned side-by-side and then shielding plates 23 may be applied, creating a subassembly 2, which may then be inserted into housing 41. Upon insertion into housing 41, the mating surfaces of the contacts of the subassembly may be exposed in slot 43, such that they can mate with patents on a card inserted in slot 43. Alternatively, shielding plates 23 may 1 be inserted into housing 41. Thereafter, connecting terminals may be inserted singly or in groups.

FIG. 12 illustrates that shielding plates 23 are not required adjacent to all of the contacting terminals. A group 2A of contacting terminals, for example, does not have adjacent shields. The contacting terminals in group 2A may be used, for example, for low speed signals. T In some embodiments the connector may include other components, such as a board lock 42.

The expression "a plurality of" in some embodiments means that the specific number may be set correspondingly according to the specification of the connector. For example, the number may be three, four, five, six, or more, which will not be particularly limited in some embodiments. As shown in FIG. 11B, shielding plates 23 of two adjacent connecting assemblies 2 are connected with each other to form a whole.

According to some embodiments, at least two signal terminals (e.g., 21) may each comprise two longer electrical contacts and two shorter electrical contacts, at least two ground terminals (e.g., 22) may be disposed such that two or more signal terminals are between two adjacent ground terminals, and two shields may be configured and arranged such that the two or more signal terminals and the two adjacent ground terminals are between the at least two shields, with the two adjacent ground terminals contacting the two shields. In some embodiments, ground terminals are orthogonal to the shields.

In some embodiments, each signal terminal may comprise an insulating sheet holding the two longer electrical contacts and two shorter electrical contacts with the bottom portions and top portions of the two longer electrical contacts and two shorter electrical contacts extending from the insulating sheet.

Figure 13A:
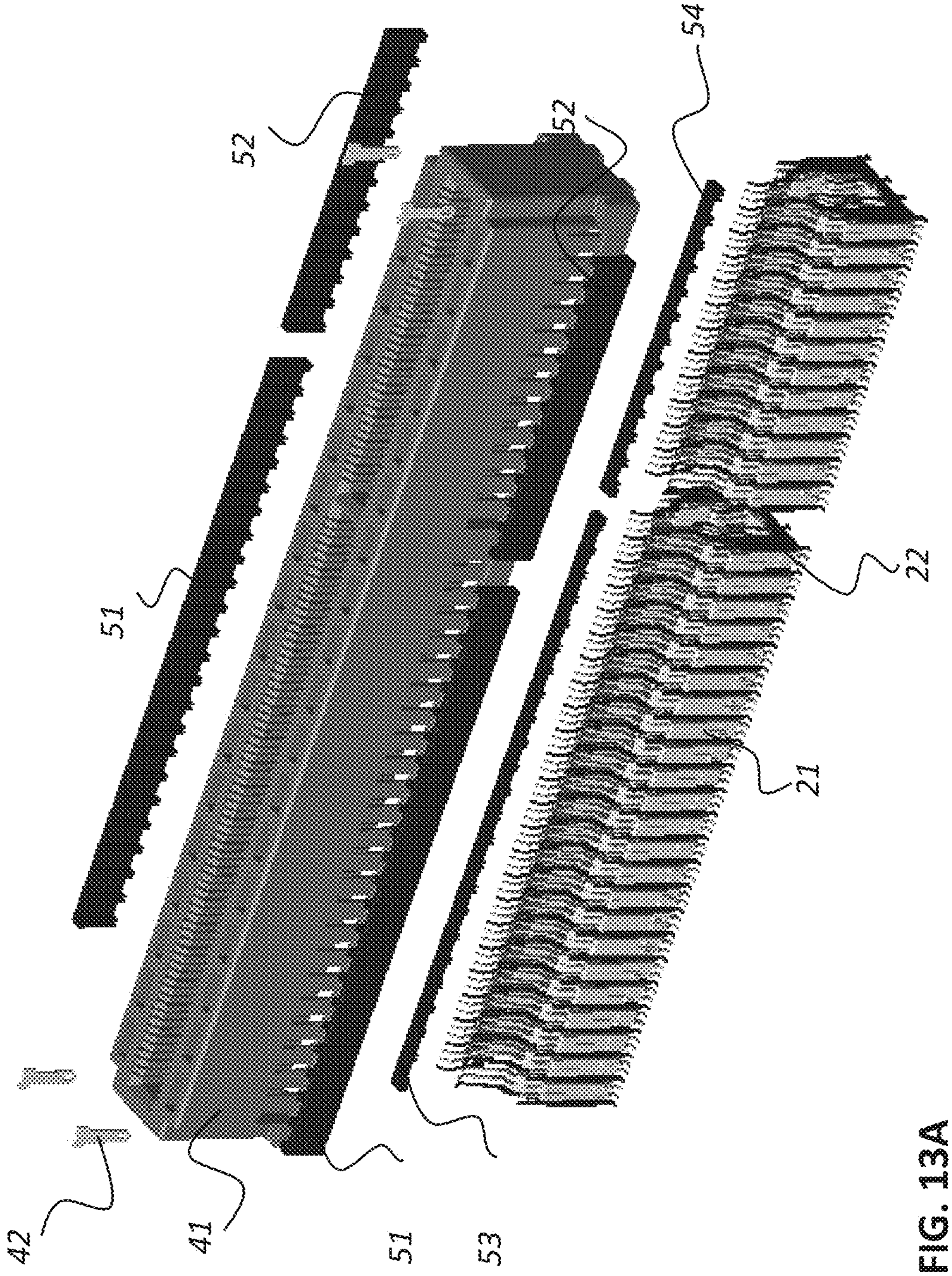
FIG. 13A is a perspective view of an alternative embodiment of a connecting subassembly.

With reference to FIG. 13A, some embodiments of a connector may include "lossy" materials, such as lossy elements 51, 52, 53, and/or 54, here shaped as strips. The inventors have recognized and appreciated that using such lossy elements may change low speed terminals into high speed terminals. For example, according to some embodiments, an electrical connector may comprise an insulative housing comprising a mating interface comprising a slot; a plurality of signal terminals each comprising two longer electrical contacts and two shorter electrical contacts, the longer electrical contacts and the shorter electrical contacts comprising contact surfaces exposed to the slot; a plurality of ground terminals disposed such that signal terminals of the plurality of signal terminals are between two adjacent ground terminals of the at least two ground terminals; and two strips of lossy material electrically coupled to the plurality of ground terminals. Additionally, the plurality of signal terminals and plurality of ground terminals may be arranged in a row parallel to the slot, and the two strips of lossy material may extend in a direction parallel to the row on opposite sides of the at least two signal terminals and the at least two ground terminals.

In some embodiments, a third strip of lossy material may be coupled to the ground terminals, with the third strip of lossy material disposed at a bottom of the slot. Alternatively or additionally, two shields may be configured and arranged such that the signal terminals and the ground terminals are between the two shields, with the ground terminals contacting the two shields.

In some embodiments, the two strips of lossy material may comprise projections engaging the plurality of ground terminals. Alternatively or additionally, the two strips of lossy material may be mounted outside the housing.

Any suitable lossy material may be used for these and other structures that are "lossy." Materials that conduct, but with some loss, or material which by another physical mechanism absorbs electromagnetic energy over the frequency range of interest are referred to herein generally as "lossy" materials. Electrically lossy materials can be formed from lossy dielectric and/or poorly conductive and/or lossy magnetic materials. Magnetically lossy material can be formed, for example, from materials traditionally regarded as ferromagnetic materials, such as those that have a magnetic loss tangent greater than approximately 0.05 in the frequency range of interest. The "magnetic loss tangent" is the ratio of the imaginary part to the real part of the complex electrical permeability of the material. Practical lossy magnetic materials or mixtures containing lossy magnetic materials may also exhibit useful amounts of dielectric loss or conductive loss effects over portions of the frequency range of interest. Electrically lossy material can be formed from material traditionally regarded as dielectric materials, such as those that have an electric loss tangent greater than approximately 0.05 in the frequency range of interest. The "electric loss tangent" is the ratio of the imaginary part to the real part of the complex electrical permittivity of the material. Electrically lossy materials can also be formed from materials that are generally thought of as conductors, but are either relatively poor conductors over the frequency range of interest, contain conductive particles or regions that are sufficiently dispersed that they do not provide high conductivity or otherwise are prepared with properties that lead to a relatively weak bulk conductivity compared to a good conductor such as copper over the frequency range of interest.

Electrically lossy materials typically have a bulk conductivity of about 1 siemen/meter to about 100,000 siemens/meter and preferably about 1 siemen/meter to about 10,000 siemens/meter. In some embodiments material with a bulk conductivity of between about 10 siemens/meter and about 200 siemens/meter may be used. As a specific example, material with a conductivity of about 50 siemens/meter may be used. However, it should be appreciated that the conductivity of the material may be selected empirically or through electrical simulation using known simulation tools to determine a suitable conductivity that provides both a suitably low crosstalk with a suitably low signal path attenuation or insertion loss.

Electrically lossy materials may be partially conductive materials, such as those that have a surface resistivity between 1 Ω/square and 100,000 Ω/square. In some embodiments, the electrically lossy material has a surface resistivity between 10 Ω/square and 1000 Ω/square. As a specific example, the material may have a surface resistivity of between about 20 Ω/square and 80 Ω/square.

In some embodiments, electrically lossy material is formed by adding to a binder a filler that contains conductive particles. In such an embodiment, a lossy member may be formed by molding or otherwise shaping the binder with filler into a desired form. Examples of conductive particles that may be used as a filler to form an electrically lossy material include carbon or graphite formed as fibers, flakes, nanoparticles, or other types of particles. Metal in the form of powder, flakes, fibers or other particles may also be used to provide suitable electrically lossy properties. Alternatively, combinations of fillers may be used. For example, metal plated carbon particles may be used. Silver and nickel are suitable metal plating for fibers. Coated particles may be used alone or in combination with other fillers, such as carbon flake. The binder or matrix may be any material that will set, cure, or can otherwise be used to position the filler material. In some embodiments, the binder may be a thermoplastic material traditionally used in the manufacture of electrical connectors to facilitate the molding of the electrically lossy material into the desired shapes and locations as part of the manufacture of the electrical connector. Examples of such materials include liquid crystal polymer (LCP) and nylon. However, many alternative forms of binder materials may be used. Curable materials, such as epoxies, may serve as a binder. Alternatively, materials such as thermosetting resins or adhesives may be used.

Also, while the above described binder materials may be used to create an electrically lossy material by forming a binder around conducting particle fillers, the application is not so limited. For example, conducting particles may be impregnated into a formed matrix material or may be coated onto a formed matrix material, such as by applying a conductive coating to a plastic component or a metal component. As used herein, the term "binder" encompasses a material that encapsulates the filler, is impregnated with the filler or otherwise serves as a substrate to hold the filler.

Preferably, the fillers will be present in a sufficient volume percentage to allow conducting paths to be created from particle to particle. For example, when metal fiber is used, the fiber may be present in about 3% to 40% by volume. The amount of filler may impact the conducting properties of the material.

Filled materials may be purchased commercially, such as materials sold under the trade name Celestran® by Celanese Corporation which can be filled with carbon fibers or stainless steel filaments. A lossy material, such as lossy conductive carbon filled adhesive preform, such as those sold by Techfilm of Billerica, Massachusetts, US may also be used. This preform can include an epoxy binder filled with carbon fibers and/or other carbon particles. The binder surrounds carbon particles, which act as a reinforcement for the preform. Such a preform may be inserted in a connector wafer to form all or part of the housing. In some embodiments, the preform may adhere through the adhesive in the preform, which may be cured in a heat treating process. In some embodiments, the adhesive may take the form of a separate conductive or non-conductive adhesive layer. In some embodiments, the adhesive in the preform alternatively or additionally may be used to secure one or more conductive elements, such as foil strips, to the lossy material.

Various forms of reinforcing fiber, in woven or non-woven form, coated or non-coated may be used. Non-woven carbon fiber is one suitable material. Other suitable materials, such as custom blends as sold by RTP Company, can be employed, as the present invention is not limited in this respect.

In some embodiments, a lossy member may be manufactured by stamping a preform or sheet of lossy material. For example, an insert may be formed by stamping a preform as described above with an appropriate pattern of openings. However, other materials may be used instead of or in addition to such a preform. A sheet of ferromagnetic material, for example, may be used.

However, lossy members also may be formed in other ways. In some embodiments, a lossy member may be formed by interleaving layers of lossy and conductive material such as metal foil. These layers may be rigidly attached to one another, such as through the use of epoxy or other adhesive, or may be held together in any other suitable way. The layers may be of the desired shape before being secured to one another or may be stamped or otherwise shaped after they are held together.

In some embodiments, any or all of lossy elements 51-54 may be used instead of or in addition to shielding plates 23. For example, any or all of lossy elements 51-54 may be arranged at two sides of and fixedly connect the ground terminals. In the embodiment illustrated, the lossy elements are separated from the signal conductors by insulative portions of the connector, including the insulative portions of housing 41 or the insulative portions of the signal terminals. When used with shielding plates 23, some or all of the lossy elements may contact the shielding plates.

Figure 13B:
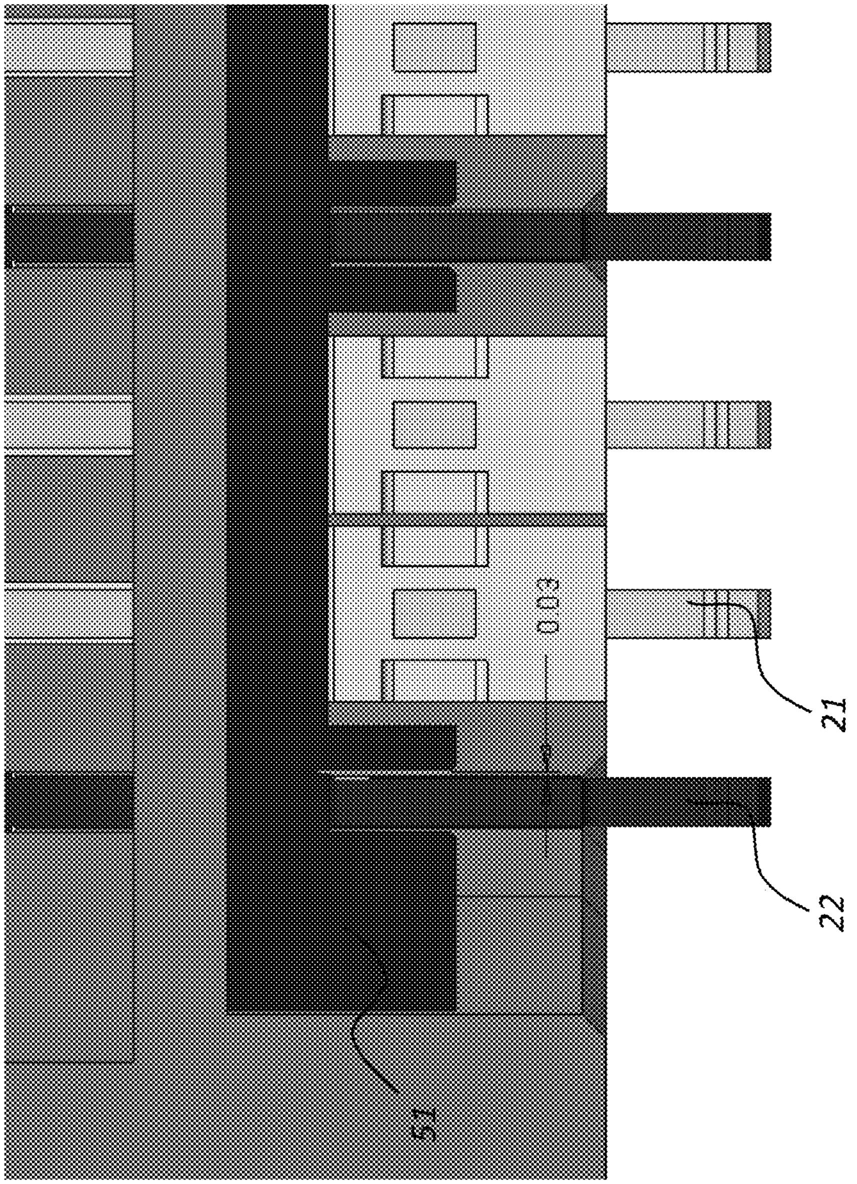
FIG. 13B is a partial enlarged view of an electrical connector of some embodiments, showing a strip of lossy material contacting two adjacent ground terminals.

Ground terminals may be connected with any or all of lossy elements 51-54. In the embodiment illustrated, connections between the lossy elements and ground terminals is made via channels formed in projecting portions of the lossy elements. The channels may receive edge portions of the ground terminals. FIG. 13B shows a partial enlarged view of an electrical connector of some embodiments, with lossy element 51 connecting the connecting terminals as described. In some embodiments, the lossy material may yield when a ground terminal is inserted in them, such that the channels may be smaller than the thickness of a ground terminal, creating an interference fit. In other embodiments, the channels may be sider than the thickness of the ground terminals and there may be a gap between lossy element 51 and ground terminal 22. For example, the gap may be approximately 0.03 mm wide. The inventors have recognized and appreciated that such a small gap does not interfere with operation of the lossy members such that a range of attachment mechanisms for the lossy elements will be suitable.

Figure 14:
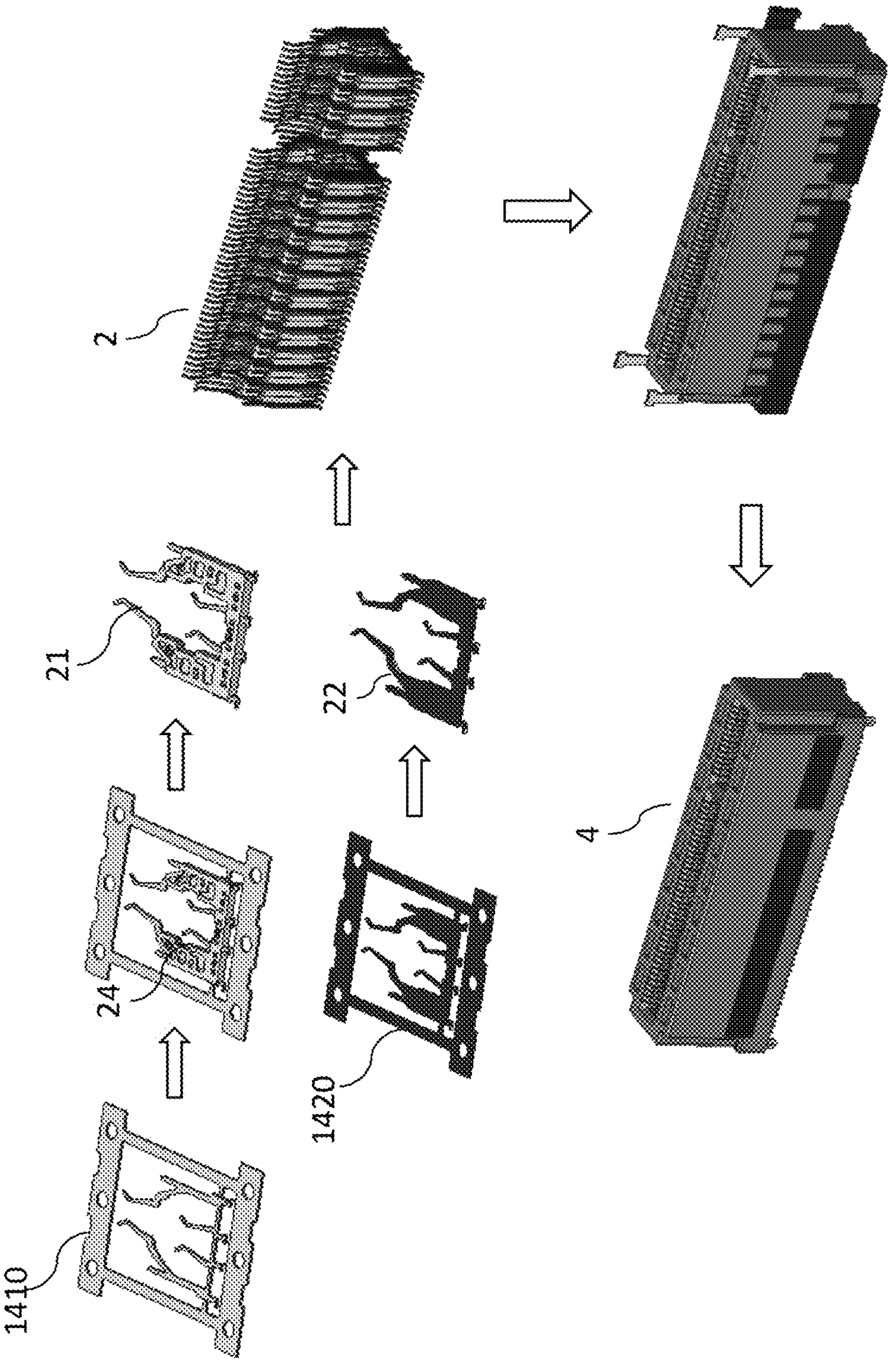
FIG. 14 is a schematic illustration of an exemplary method for assembling a high-density edge connector according to some embodiments.

FIG. 14 is a schematic illustration of an exemplary method of assembling an edge connector of some embodiments. FIG. 14 illustrates a lead frame 1410 for a signal terminal that may be stamped from a sheet of metal. As described above, the lead frame may include signal contacts as well as tie bars and carrier strips.

The lead frame may then be shaped with twists, as described above, or formed with other shapes.

In a subsequent operation, intermediate portions of the signal conductors may be overmolded with an insulative layer. This insulative layer may hold the signal contacts together as a conducting terminal. In this state, the tie bars may be severed, separating the conducting terminal from the carrier strip. In some embodiments, at least one signal terminal may comprise electrical contacts and an insulative layer, with the electrical contacts held by the insulative layer.

Ground terminals may also be made from a lead frame 1420 stamped from a sheet of metal. The lead frame 1420 is illustrated without twists in the beams that carry contact surfaces. However, it should be appreciated that such twists may be included if desired to reduce the insertion and retention force of the mating surfaces on those beams. As with the lead frame 1410 for the signal terminals, the ties bars may be severed for lead from 1420, releasing the ground terminals for the carrier strip.

The signal terminals may be arranged in any suitable pattern. In the embodiments described above, a portion of the connector is configured for high frequency operation. That portion of the connector has alternating ground terminals and pairs of signal terminals. In some embodiments, the signal terminals and ground terminals are arranged in a repeating pattern of ground terminal, first signal terminal, second signal terminal, and so on. However, any suitable pattern of ground terminals and signal terminals may be used in any portion of the connector.

Signal terminals and ground terminals of the desired pattern may then be inserted into an insulative housing. Top portions of the contacts of the signal terminals and ground terminals may be aligned to form a mating interface. Those top portions, carrying mating surfaces of the contacts, may line opposing walls of a slot. Bottom portions of the contacts may extend from a bottom face of the insulative housing. Those portions may form a mounting interface, for mounting the connector to a printed circuit board. Components such as hold downs may then be inserted to aid in attaching the connector to a printed circuit board. In some embodiments, the bottom portions of the plurality of longer electrical contacts and the plurality of shorter electrical contacts may comprise contact feet.

Once the ground terminals are inserted in the housing, lossy elements may be attached. In the embodiment of FIG. 14, the lossy elements are inserted into openings of the housing 41. Housing 41 includes passages from the sidewalls where the lossy elements are inserted to an interior cavity into which the conducting terminals are inserted. Projections from the lossy elements may extend through these passages such that, when seated in the openings, the lossy elements make contact with edge portions of the ground terminals.

According to some embodiments, an electrical connector may be manufactured by selecting, for each of equally spaced channels in a housing of the electrical connector, from between a signal terminal and a ground terminal, and inserting the selected signal terminals and ground terminals into the channels. In some embodiments, the manufacturing process may include connecting ground terminals with two shields. Alternatively or additionally, the manufacturing process may include connecting ground terminals with lossy strips.

Figure 15:
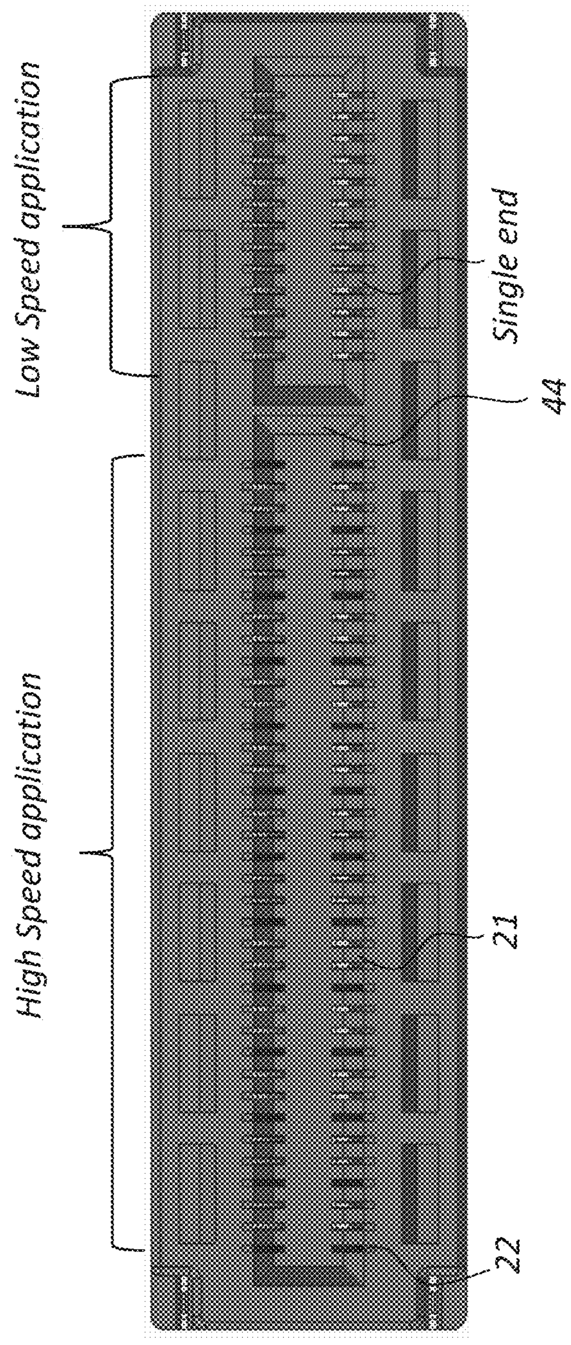
FIG. 15 is a top view of an electrical connector of some embodiments.

FIG. 15 is a top view of an electrical connector of some embodiments. FIG. 15 shows the mating face of the connector. FIG. 15 illustrates that the slot 43 may be divided into two sections, with contacts having different uses. Those sections may be physically separated, such as by a divider 44. As illustrated in connection with FIG. 1A, such a divider may match a slot in a card inserted into the connector and may foreclose the card being inserted into the connector with him proper orientation. However, it is not necessary that the portions of the connector tour configured for different uses be physically separated by a divider. For example, FIG. 15 illustrates that the section to the right of divider 44 contains contacts configured both for low speed applications and for single ended applications.

As shown in FIG. 15, contacts of both the signaling ground terminals line opposite sidewalls of the slot. For high-speed operations, the conducting terminals may be arranged in a pattern with two signal terminals between two adjacent ground terminals. In this configuration, the signal contacts may be paired to carry differential signals. The pairs may be formed with contacts aligning the same wall of the slot 43.

Figure 16:
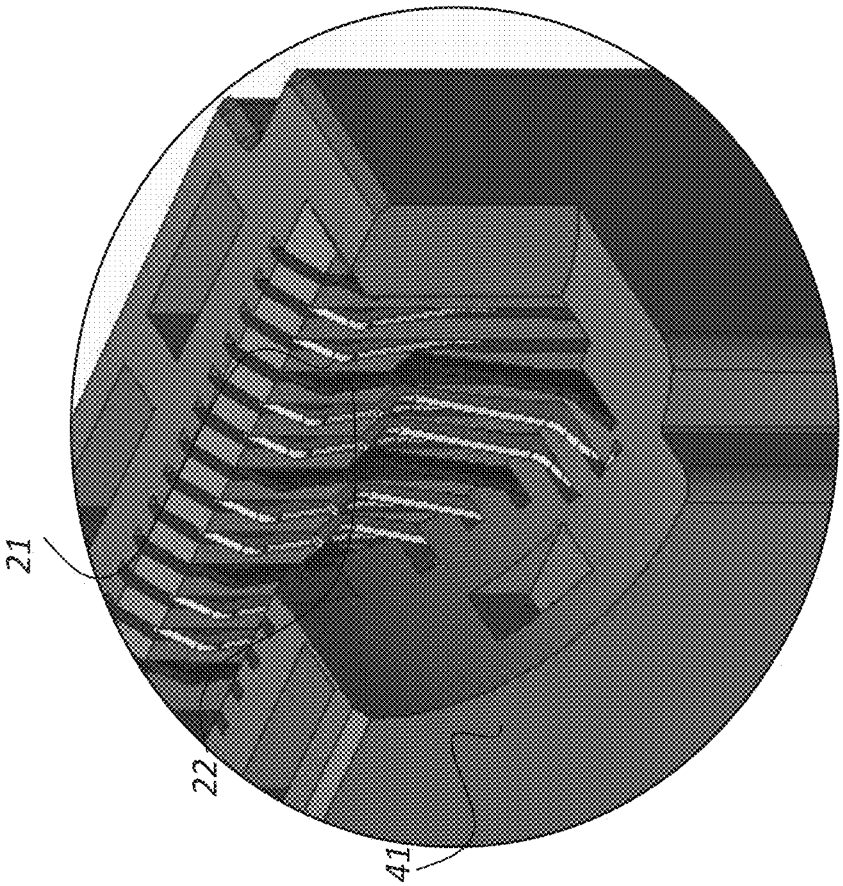
FIG. 16 is a partial enlarged view of an electrical connector, with a portion of the insulator cut away to reveal an interior of a slot in a mating interface, of some embodiments.

FIG. 16 is a partial enlarged view of the electrical connector of the FIG. 15, with a portion of the insulative housing cut away to reveal the contacts lining one sidewall of slot 43. The mating surfaces of the contacts lining the far wall are visible in FIG. 16.

Figure 17:
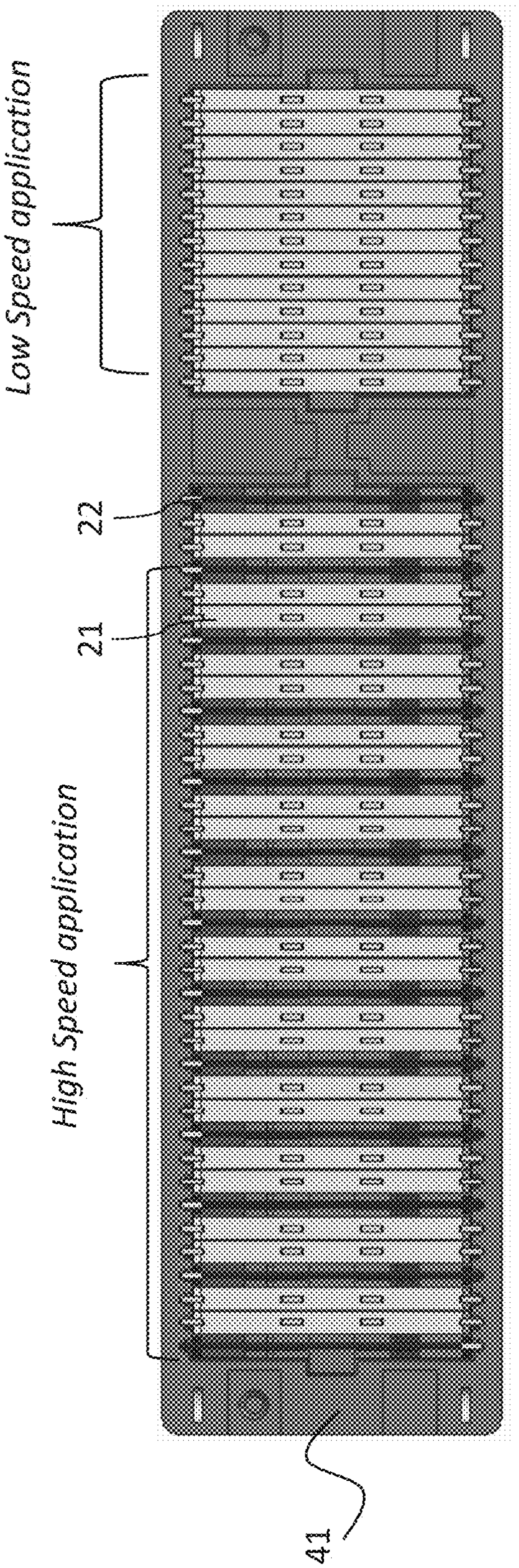
FIG. 17 is a bottom view of an electrical connector of some embodiments manufactured with connecting terminals selected to carry both high speed and low speed signals.

FIG. 17 is a bottom view of the electrical connector of FIG. 15, illustrating a selection of connecting terminals inserted into housing 41. In the segment configured for high-speed application, the connecting terminals are arranged in a pattern of two signal terminals between adjacent ground terminals. In the segment configured for low speed application, however, only signal terminals are inserted.

As can be seen in FIG. 17, in the section for high speed application, the signal contacts for each two signal terminals are arranged in pairs. Here, four such pairs are seen, corresponding to the two shorter signal contacts, at the center of the connector, and two longer signal contacts, at the periphery. In this example, each pair comprises a signal contact in each of the two signal terminals. For signal terminals formed, for example as in FIG. 14, the signal contacts of each pair have their broadsides generally facing each other and may be broadside coupled over all or a substantial portion of their length. However, where twists are included in either the long or short signal contacts, portions of the signal contacts of the pair may be edge coupled. In either configuration, those four pairs may be bounded on two or four sides by ground structures. Two sides of the signal terminals, to the left and right in FIG. 17, are bounded by ground terminals 22. Two sides, to the top and bottom in FIG. 17, may be bounded by shields 23 (not visible in FIG. 17). These ground structures may reduce crosstalk in comparison to a connector assembled without such ground structures.

Figure 18C:
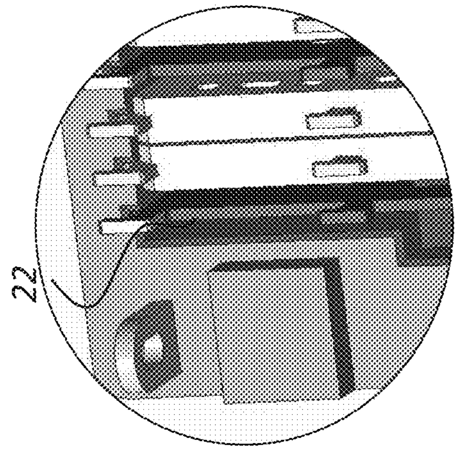
FIG. 18A-C are partial enlarged views of an electrical connector showing alternative configurations achieved with selection of different connecting terminals.
Figure 18B:
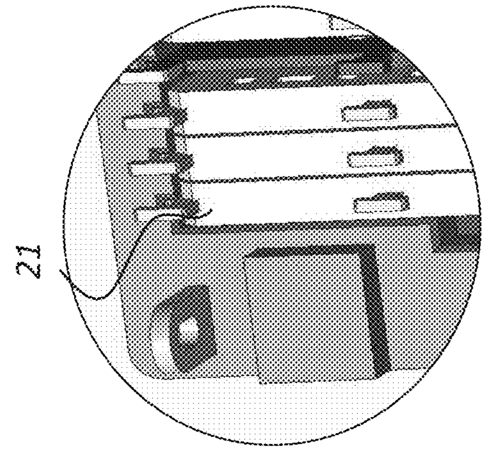
Figure 18A:
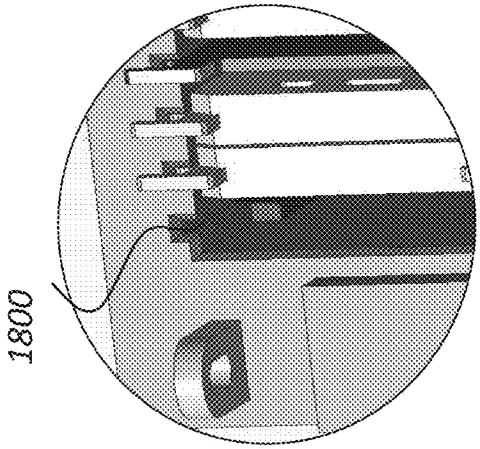

FIG. 18A-C are partial enlarged views of the bottom of an electrical connector of some embodiments. The cavity internal to a connector housing 41 into which the connecting terminals are inserted is visible in the underside view. That cavity is lined by channels 1800 that each is shaped to receive either a signal terminal or a ground terminal. The channels are spaced evenly, center-to-center such that, regardless of whether a signal terminal or a ground terminal is inserted in the center to center spacing of the meeting surfaces of the terminal and the contact foot portions of the terminal will be the same. Uniform spacing of the connecting terminals is possible, despite added thickness of the signal terminals relative to the ground terminals as a result of the insulative layer, because engagement of the connecting terminals and the connector housing is via features that are the same thickness on both types of connecting terminals. Features, such as features 1810 (FIGS. 4 and 10), may be formed to extend from the insulating layer on portions of the leadframe that are retained in the signal terminal after it is cut from its carrier strip. When the leadframes for the signal terminals and the ground terminals are stamped from metal of the same thickness, the features such as features 1810 will have the same thickness an edge of a ground terminal such that both will fit within, and can be retained in a housing channel 1800. FIG. 18A illustrates the underside of a connector with a housing channel 1800 visible. Adjacent housing channels are present but occupied by two signal terminals and a ground terminal.

In some embodiments, a first signal terminal and a second signal terminal may be disposed in adjacent channels, with the first signal terminal abutting the second signal terminal. Additionally, a third signal terminal and a first ground terminal may be disposed in adjacent channels, with the third signal terminal separated from the first ground terminal.

FIG. 18B illustrates that a signal terminal may be inserted into housing channel 1800. Such a configuration may be useful, for example, when the illustrated segment of the connector is used to carry low speed or single ended signals. In contrast, FIG. 18C illustrates that a ground terminal may be inserted into housing channel 1800. Such a configuration may be useful, for example, when the illustrated segment of the connector is used to carry high speed signals. There is more side-to-side space between the ground terminal and the neighboring signal terminal in FIG. 18C than between the two neighboring signal terminals in FIG. 18B. Nonetheless, the center to center spacing is the same.

Having thus described several aspects of at least one embodiment of this invention, it is to be appreciated that various alterations, modifications, and improvements will readily occur to those skilled in the art.

For example, it is described that openings in an overmolding (e.g., overmold 24 in FIG. 14) and/or slots in a spacer and/or housing exposes the one or more portions of one or more conductors to air. Air has a low dielectric constant relative to an insulating material used to form overmoldings, spacers, and housings. The relative dielectric constant of air, for example, may be about 1.0, which contrasts to a dielectric housing with a relative dielectric constant in the range of about 2.4 to 4.0. The improved performance described herein may be achieved with a openings filled with material other than air, if the relative dielectric constant of that material is low, such as between 1.0 and 2.0 or between 1.0 and 1.5, in some embodiments.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as “first,” “second,” “third,” etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

All definitions, as defined and used herein, should be understood to control over dictionary definitions, definitions in documents incorporated by reference, and/or ordinary meanings of the defined terms.

The indefinite articles “a” and “an,” as used herein in the specification and in the claims, unless clearly indicated to the contrary, should be understood to mean “at least one.”

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

As used herein in the specification and in the claims, the phrase "equal" or "the same" in reference to two values (e.g., distances, widths, etc.) means that two values are the same within manufacturing tolerances. Thus, two values being equal, or the same, may mean that the two values are different from one another by ±5%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An electrical connector, comprising:

at least two signal terminals each comprising two longer electrical contacts and two shorter electrical contacts;

at least two ground terminals disposed such that two or more of the at least two signal terminals are between two adjacent ground terminals of the at least two ground terminals; and two shields configured and arranged such that the two or more of the at least two signal terminals and the two adjacent ground terminals are between the at least two shields, with the two adjacent ground terminals contacting the two shields, wherein the shields comprise main bodies and installation grooves formed in the main bodies, and the at least two ground terminals are clamped in respective installation grooves.

2. The electrical connector of claim 1, wherein:

the two or more of the at least two signal terminals and the at least two ground terminals are equally spaced, center-to-center;

the connector comprises a housing having a plurality of equally spaced channels; and the at least two signal terminals and the at least two ground terminals are disposed within the equally spaced channels.

3. The electrical connector of claim 1, wherein:

for each of the two or more signal terminals, electrical contacts of the two longer electrical contacts and of the two shorter electrical contacts are uncoupled within the electrical connector.

4. The electrical connector of claim 1, wherein:

the at least two ground terminals are orthogonal to the two shields.

5. The electrical connector of claim 1, wherein:

the shields comprise protrusions from the main bodies extending into the installation grooves; and the protrusions contact ground terminals in the installation grooves.

6. The electrical connector of claim 1, wherein:

the at least two signal terminals and the at least two ground terminals are arranged in a repeating pattern of a ground terminal, first signal terminal, second signal terminal; and corresponding electrical contacts in the first signal terminal and the second signal terminal form broadside coupled differential pairs.

7. The electrical connector of claim 6, wherein:

each first and second signal terminal is bounded:

on a first side by a first ground terminal of the at least two ground terminals, on a second side, parallel to the first side, by a second ground terminal of the at least two ground terminals, on a third side, orthogonal to the first side, by a first shield of the two shields, and on a fourth side, parallel to the third side, by a second shield of the two shields, such that the differential pairs are bounded on four sides by ground conductors.

8. The electrical connector of claim 1, wherein:

the at least two ground terminals each include two longer electrical contacts and two shorter electrical contacts integral with the ground terminals.

9. The electrical connector of claim 1, wherein:

for each of the at least two signal terminals, the two longer electrical contacts and two shorter electrical contacts each comprises a mating surface; and a distance between the contact surfaces of the two longer electrical contacts and two shorter electrical contacts is between 7 mm and 8.5 mm.

10. The electrical connector of claim 1, wherein:

the shields each comprise a shielding plate comprising:

a plurality of openings extending along a first axis in the shielding plate, wherein each of the plurality of openings receives an edge of a respective ground terminal orthogonal to the shielding plate, and wherein the shielding plate comprises two or more portions protruding into the plurality of openings so as to contact and apply pressure against the respective ground terminal.

11. The electrical connector of claim 10, wherein:

the at least two signal terminals comprise an insulative portion holding the two longer electrical contacts and the two shorter electrical contacts.

12. An electrical connector, comprising:

a housing comprising a mating face and a mounting face with a slot in the mating face;

a plurality of longer electrical contacts; and a plurality of shorter electrical contacts, wherein:

longer electrical contacts of the plurality of longer electrical contacts comprise a bottom portion, a middle portion, and a top portion, with the top portion comprising a surface exposed within the slot and the bottom portion extending from the mounting face of the housing;

shorter electrical contacts of the plurality of shorter electrical contacts comprise a bottom portion, a middle portion, and a top portion, with the top portion comprising a surface exposed within the slot and the bottom portion extending from the mounting face of the housing;

the middle portion of the shorter electrical contacts of the plurality of shorter electrical contacts further comprise a twist; and the twist in the longer electrical contacts is further from the mounting face than the twist of the shorter electrical contacts.

13. The electrical connector of claim 12, wherein:

the middle portion of the shorter electrical contacts of the plurality of shorter electrical contacts are elongated along an axis parallel to a first direction; and the twist is about the axis.

14. The electrical connector of claim 13, wherein:

the twist is between 85 and 95 degrees.

15. The electrical connector of claim 12, wherein:

the slot has an elongated direction;

the shorter electrical contacts of the plurality of shorter electrical contacts comprise a first surface;

at the bottom portion of the respective shorter electrical contact, the first surface is within 5 degrees of perpendicular to the elongated direction of the slot; and at the top portion of the respective shorter electrical contact, the first surface is within 5 degrees of parallel to the elongated direction of the slot.

16. The electrical connector of claim 12 further comprising:

a plurality of connecting subassemblies inserted into the housing, each of the plurality of connecting subassemblies comprising:

longer electrical contacts of the plurality of longer electrical contacts;

shorter electrical contacts of the plurality of shorter electrical contacts; and an insulative material overmolded on the middle portions of the longer electrical contacts and the shorter electrical contacts of the connecting subassembly.

17. The electrical connector of claim 15, wherein:

the first surface at the top portion of the shorter electrical contacts of the plurality of shorter electrical contacts comprises a mating surface;

the slot has an insertion direction;

the top portion of the longer electrical contacts of the plurality of longer electrical contacts comprises a mating surface; and the mating surfaces of the shorter electrical contacts of the plurality of shorter electrical contacts and of the longer electrical contacts of the plurality of longer electrical contacts are separated in the insertion direction by between 6 and 9 millimeters.

18. The electrical connector of claim 15, wherein:

the longer electrical contacts of the plurality of longer electrical contacts comprise a second surface;

at the bottom portion of the respective longer electrical contact, the second surface is within 5 degrees of perpendicular to the elongated direction of the slot; and at the top portion of the respective longer electrical contact, the second surface is within 5 degrees of perpendicular to the elongated direction of the slot.

19. The electrical connector of claim 18, wherein:

the top portion of the longer electrical contacts of the plurality of longer electrical contacts comprises an edge perpendicular to the first surface and a mating surface on the edge.

20. The electrical connector of claim 19, wherein:

the top portion of the longer electrical contacts of the plurality of longer electrical contacts comprises a primary elastic arm and secondary elastic arm.

21. The electrical connector of claim 12, wherein:

the bottom portions of the plurality of longer electrical contacts and the plurality of shorter electrical contacts comprise contact feet.

22. The electrical connector of claim 12, wherein:

the slot comprises a first side wall and a second side wall opposing the first side wall;

a first portion of the plurality of longer electrical contacts are disposed adjacent the first side wall;

a second portion of the plurality of longer electrical contacts are disposed adjacent the second side wall;

a first portion of the plurality of shorter electrical contacts are disposed adjacent the first side wall; and a second portion of the plurality of shorter electrical contacts are disposed adjacent the second side wall.

23. The electrical connector of claim 12, wherein:

the connector comprises a plurality of signal terminals disposed within the housing, each signal terminal comprising two longer electrical contacts and two shorter electrical contacts; and each signal terminal comprises an insulating sheet holding the two longer electrical contacts and two shorter electrical contacts with the bottom portions and top portions of the two longer electrical contacts and two shorter electrical contacts extending from the insulating sheet.

24. An electrical connector comprising:

a housing including a plurality of channels that are equally spaced center-to-center from each other, wherein each of the plurality of channels is configured to receive either a signal terminal or a ground terminal;

a plurality of signal terminals in channels of the plurality of channels; and a plurality of ground terminals in channels of the plurality of channels.

25. The electrical connector of claim 24, wherein:

the plurality of signal terminals each comprises a plurality of electrical contacts and an insulative layer and the plurality of electrical contacts are held by the insulative layer the plurality of electrical contacts are held by the insulative layer such that the plurality of signal terminals have a first thickness; and the plurality of ground terminals have a second thickness, less than the first thickness such that there is a gap between each of the plurality of ground terminals and an adjacent signal terminal that is wider than a gap between two adjacent signal terminals.

26. The electrical connector of claim 25, wherein:

the plurality of signal terminals each comprises a feature extending from the insulative layer and engaged in a respective channel of the plurality of channels, the features of the plurality of signal terminals each has a thickness that is less than the thickness of the insulative layer; and the plurality of ground terminals each comprises a feature engaged in a respective channel of the plurality of channels, the plurality of ground terminals each has a thickness that is the same as the thickness of the features of the plurality of signal terminals.

27. The electrical connector of claim 24, wherein:

a first signal terminal and a second signal terminal are disposed in adjacent channels of the plurality of channels, with the first signal terminal abutting the second signal terminal; and a third signal terminal and a first ground terminal are disposed in adjacent channels, with the third signal terminal separated from the first ground terminal.

* * * * *